(12) United States Patent
Qiao et al.

(10) Patent No.: US 12,610,150 B2
(45) Date of Patent: Apr. 21, 2026

(54) IMAGE PROCESSING METHOD AND ELECTRONIC DEVICE

(71) Applicant: Honor Device Co., Ltd., Shenzhen (CN)

(72) Inventors: Xiaolei Qiao, Shenzhen (CN); Bin Xiao, Shenzhen (CN); Huaiqian Li, Shenzhen (CN); Zhizhong Zhao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/728,261

(22) PCT Filed: Aug. 21, 2023

(86) PCT No.: PCT/CN2023/114005
§ 371 (c)(1),
(2) Date: Jul. 11, 2024

(87) PCT Pub. No.: WO2024/055816
PCT Pub. Date: Mar. 21, 2024

(65) Prior Publication Data
US 2025/0080864 A1     Mar. 6, 2025

(30) Foreign Application Priority Data

Sep. 15, 2022    (CN) ......................... 202211123861.X

(51) Int. Cl.
*H04N 23/85*      (2023.01)
*H04N 23/741*     (2023.01)
(Continued)

(52) U.S. Cl.
CPC ........... *H04N 23/85* (2023.01); *H04N 23/741* (2023.01); *H04N 23/745* (2023.01); *H04N 23/76* (2023.01)

(58) Field of Classification Search
CPC .... H04N 23/85; H04N 23/741; H04N 23/745; H04N 23/76; H04N 23/62; H04N 23/667;
(Continued)

(56) References Cited

U.S. PATENT DOCUMENTS 9,036,050 B2      5/2015   Jo
9,979,896 B2 *    5/2018   Masuno .............. H04N 23/743
(Continued)

FOREIGN PATENT DOCUMENTS

CN           103379288 A      10/2013
CN           107545546 A       1/2018
(Continued)

OTHER PUBLICATIONS

Xia Xide et al: "Joint Bilateral Learning for Real-Time Universal Photorealistic Style Transfer", Computer Vision—ECCV 2020. 16th European Conference Aug. 23-28, 2020Glasgow, UK, Aug. 23, 2020 Aug. 23, 2020-Aug. 28, 2020 (Aug. 28, 2020), pp. 327-342.

*Primary Examiner* — Michael Lee
(74) *Attorney, Agent, or Firm* — Slater Matsil, LLP

(57)                    ABSTRACT

A light source of a photographing environment in which the electronic device is located is a flicker light source. The method includes: running a camera application in the electronic device; displaying a first image, where first exposure time is less than first duration, and the first image includes banding and/or a color cast image area; detecting a first operation; obtaining a second image in response to the first operation, where second exposure time is an integer multiple of the first duration; obtaining a color transformation matrix and/or a brightness parameter based on the first image and the second image; performing first image processing on the first image based on the color transformation matrix and/or the brightness parameter, to obtain a third image, where the third image is an image obtained by removing the banding
(Continued)

300

Run a camera application in an electronic device — S310

Display a first image, where the first image includes banding and/or a color cast image area — S320

Detect a first operation, where the first operation indicates the electronic device to take a photo or a video — S330

Obtain a second image in response to the first operation — S340

Obtain a color transformation matrix and/or a brightness parameter based on the first image and the second image — S350

Perform first image processing on the first image based on the color transformation matrix and/or the brightness parameter, to obtain a third image — S360

Display or save the third image — S370 and/or the color cast image area; and displaying or saving the third image.

20 Claims, 22 Drawing Sheets

(51) Int. Cl.
    H04N 23/745 (2023.01)
    H04N 23/76 (2023.01)

(58) Field of Classification Search
    CPC ........ H04N 23/81; H04N 9/77; G06N 3/0464;
                    G06N 3/084; G06N 3/09; G06N 3/04;
                    G06T 2207/10024; G06T 5/50
    See application file for complete search history.

(56) References Cited

U.S. PATENT DOCUMENTS

| | | | |
|---|---|---|---|
| 10,628,923 | B2 | 4/2020 | Takagi et al. |
| 11,252,340 | B1 * | 2/2022 | Yang .................... H04N 23/745 |
| 2008/0089580 | A1 | 4/2008 | Marcu |
| 2009/0147103 | A1 * | 6/2009 | Chao ...................... H04N 23/71 |
| | | | 348/226.1 |
| 2010/0013953 | A1 * | 1/2010 | Niikura ................ H04N 23/745 |
| | | | 348/226.1 |
| 2011/0205381 | A1 | 8/2011 | Vranceanu et al. |
| 2011/0255786 | A1 * | 10/2011 | Hunter ..................... H04N 5/21 |
| | | | 382/190 |
| 2012/0002074 | A1 * | 1/2012 | Baba .................... H04N 23/745 |
| | | | 348/E5.078 |
| 2017/0041542 | A1 * | 2/2017 | Ono ..................... H04N 25/531 |
| 2017/0134634 | A1 | 5/2017 | Jin et al. |
| 2017/0366730 | A1 * | 12/2017 | Onodera ............. H04N 23/745 |
| 2020/0396369 | A1 | 12/2020 | Fujiwara |
| 2021/0035272 | A1 * | 2/2021 | Yao ........................ H04N 23/76 |
| 2021/0281734 | A1 | 9/2021 | Yamamoto et al. |
| 2022/0294970 | A1 * | 9/2022 | Nguyen ............... H04N 23/745 |
| 2023/0276136 | A1 | 8/2023 | Cui et al. |

FOREIGN PATENT DOCUMENTS

| | | |
|---|---|---|
| CN | 110958401 A | 4/2020 |
| CN | 111209775 A | 5/2020 |
| CN | 111491111 A | 8/2020 |
| CN | 112738414 A | 4/2021 |
| CN | 113992852 A | 1/2022 |
| CN | 114513609 A | 5/2022 |
| WO | 2020192774 A1 | 10/2020 |

* cited by examiner

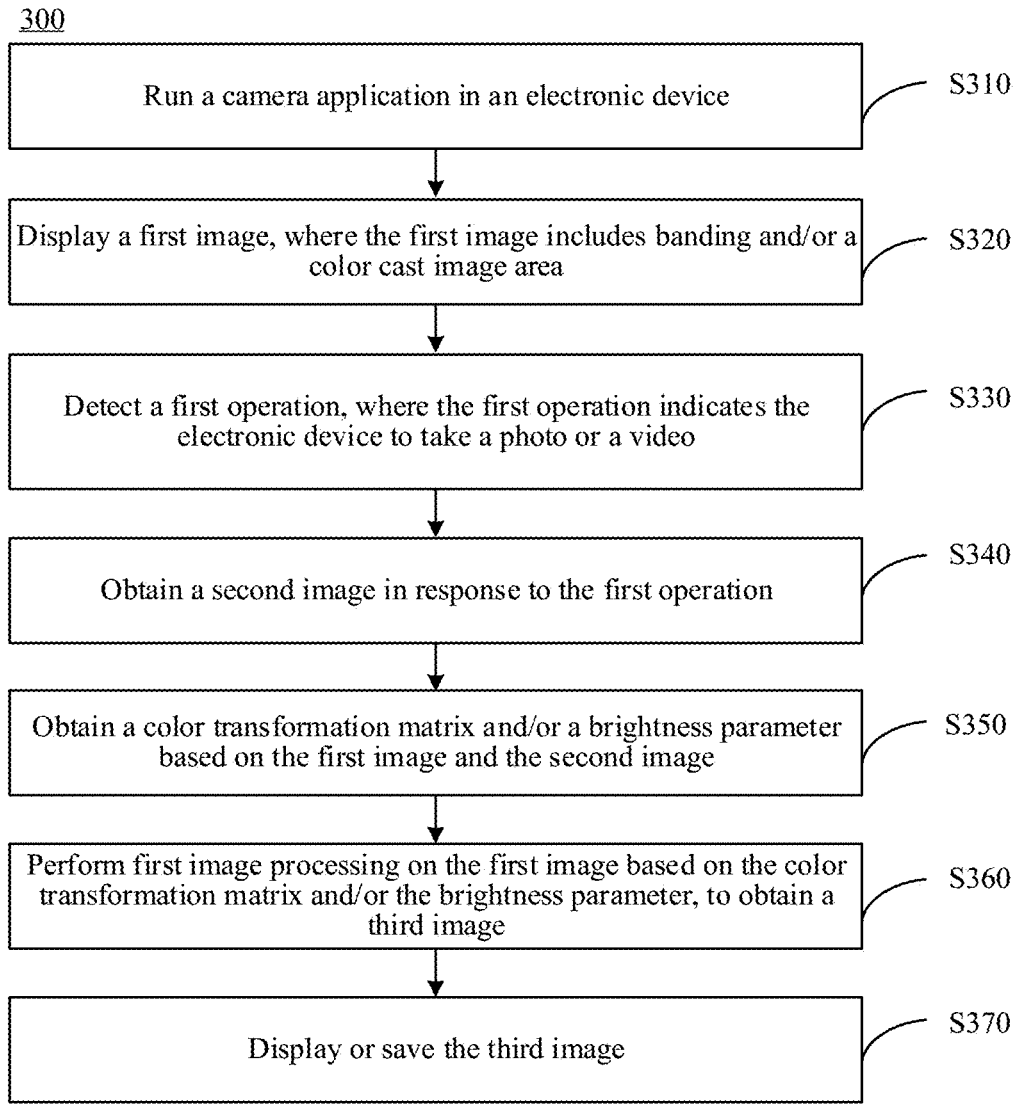

300

| | |
|---|---|
| Run a camera application in an electronic device | S310 |
| Display a first image, where the first image includes banding and/or a color cast image area | S320 |
| Detect a first operation, where the first operation indicates the electronic device to take a photo or a video | S330 |
| Obtain a second image in response to the first operation | S340 |
| Obtain a color transformation matrix and/or a brightness parameter based on the first image and the second image | S350 |
| Perform first image processing on the first image based on the color transformation matrix and/or the brightness parameter, to obtain a third image | S360 |
| Display or save the third image | S370 |

FIG. 5

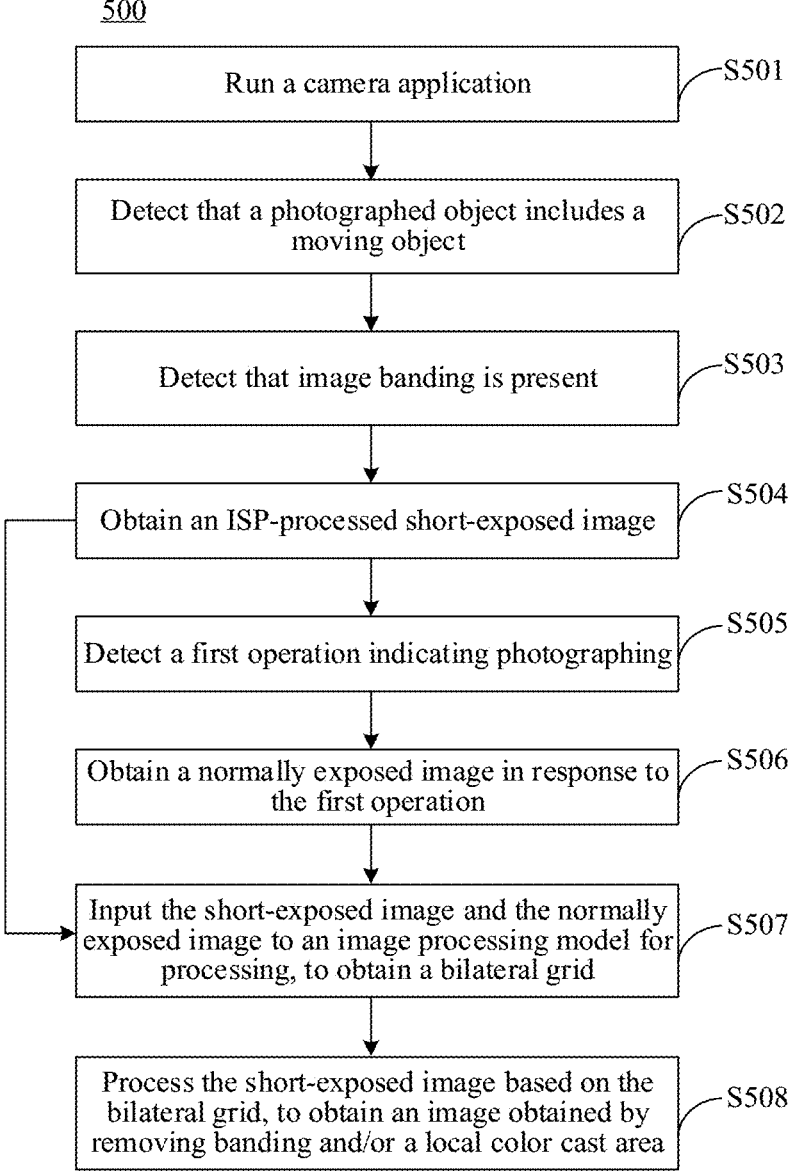

500

| Run a camera application | S501 |

Detect that a photographed object includes a moving object — S502

Detect that image banding is present — S503

Obtain an ISP-processed short-exposed image — S504

Detect a first operation indicating photographing — S505

Obtain a normally exposed image in response to the first operation — S506

Input the short-exposed image and the normally exposed image to an image processing model for processing, to obtain a bilateral grid — S507

Process the short-exposed image based on the bilateral grid, to obtain an image obtained by removing banding and/or a local color cast area — S508

FIG. 7

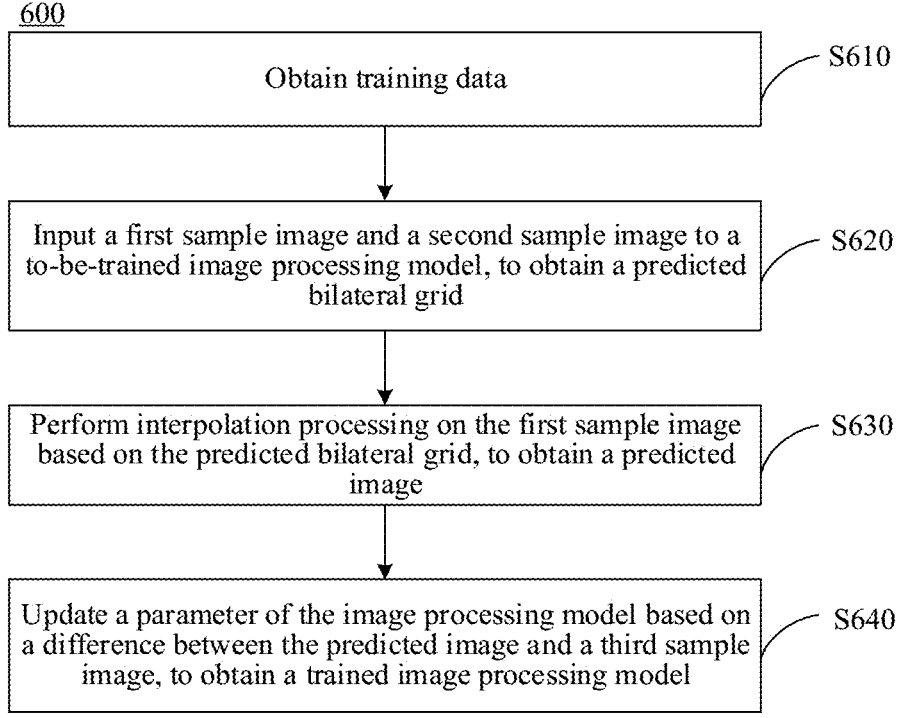

600

Obtain training data                                                          ⌐ S610

Input a first sample image and a second sample image to a
to-be-trained image processing model, to obtain a predicted               ⌐ S620
bilateral grid Perform interpolation processing on the first sample image
based on the predicted bilateral grid, to obtain a predicted               ⌐ S630
image Update a parameter of the image processing model based on
a difference between the predicted image and a third sample               ⌐ S640
image, to obtain a trained image processing model

FIG. 8

IMAGE PROCESSING METHOD AND ELECTRONIC DEVICE

CROSS-REFERENCE TO RELATED APPLICATIONS

This application is a national stage of International Application No. PCT/CN2023/114005, filed on Aug. 21, 2023, which claims priority to Chinese Patent Application No. 202211123861.X, filed on Sep. 15, 2022. The disclosures of both of the aforementioned applications are hereby incorporated by reference in their entireties.

TECHNICAL FIELD

This application relates to the field of images, and in particular, to an image processing method and an electronic device.

BACKGROUND

With the development of image technologies in electronic devices, users have an increasingly high requirement for a photographing function. For example, when a user photographs a moving object, the user usually expects that an electronic device can capture an image of the moving object at a moment of motion. Because the photographed object is in motion, the electronic device often needs to reduce motion blur in the image. Currently, to reduce the motion blur in the image, the electronic device may usually shorten exposure time and increase a sensitivity value. However, in a photographing scene with a charged light source (for example, a 50 HZ alternating current), shortening the exposure time may cause the exposure time to not satisfy an integer multiple of 10 ms. If the exposure time does not satisfy an integer multiple of 10 ms, an image banding (banding) problem may occur in an image collected by the electronic device, for example, alternately light and dark banding, or a color cast problem in a local image area, so that image quality is affected.

Therefore, how to remove the image banding and/or the local color cast in the image and improve the image quality become an urgent problem that needs to be resolved.

SUMMARY

This application provides an image processing method and an electronic device, to remove image banding and/or local color cast in an image and improve image quality.

According to a first aspect, an image processing method is provided. The method is applied to an electronic device. A light source of a photographing environment in which the electronic device is located is a flicker light source. The image processing method includes:

running a camera application in the electronic device;

displaying a first image, where the first image is an image of a photographed object collected based on first exposure time, the photographed object is a moving object, the first exposure time is less than first duration, and the first image includes banding and/or a color cast image area;

detecting a first operation, where the first operation indicates the electronic device to take a photo or a video;

obtaining a second image in response to the first operation, where the second image is an image of the photographed object collected based on second exposure time, and the second exposure time is an integer multiple of the first duration;

obtaining a color transformation matrix and/or a brightness parameter based on the first image and the second image, where the color transformation matrix is used for adjusting a color of the first image, and the brightness parameter is used for adjusting brightness of the first image;

performing first image processing on the first image based on the color transformation matrix and/or the brightness parameter, to obtain a third image, where the third image is an image obtained by removing the banding and/or the color cast image area; and displaying or saving the third image.

In this embodiment of this application, the light source of the photographing environment in which the electronic device is located is the flicker light source. When the electronic device needs to shorten exposure time during photographing a moving item, resulting in banding in an image, in this embodiment of this application, color transfer and brightness transfer are performed on the first image (an exposed image) by using the second image (for example, a normally exposed image) as a reference, to obtain the color transformation matrix and/or the brightness parameter; the banding and/or the color cast image area in the first image are/is removed based on the color transformation matrix and/or the brightness parameter; and it is ensured that banding and/or a color cast image area in an image are/is removed during collecting the image of the moving photographed object at a moment of motion to improve image quality.

With reference to the first aspect, in some implementations of the first aspect, the method further includes:

inputting the first image and the second image to an image processing model to obtain bilateral grid data, where the image processing model is configured to perform color transfer processing and brightness transfer processing on the first image by using the second image as a reference, the bilateral grid data includes the color transformation matrix and/or the brightness parameter, and a size of the first image is the same as a size of the second image.

In this embodiment of this application, a bilateral grid that transfers a color and brightness of an image frame obtained with normal exposure time or long exposure time to an image frame with short exposure time may be obtained by using the image processing model. In a photographing scene with a flicker light source with a 50 HZ alternating current, because the normal exposure time or long exposure time is an integer multiple of 10 ms, image banding or a color cast image area usually does not exist in a long-exposed image and a normally exposed image. The color transformation matrix and/or the brightness parameter are/is obtained based on the bilateral grid output by the image processing model. A difference in image content between the first image and the second image can be identified when the color transfer and the brightness transfer are performed on the first image by the image processing model. Therefore, the color transformation matrix and/or the brightness parameter are/is obtained by using the image processing model, so that a ghost area does not be introduced when color adjustment and/or brightness adjustment are/is performed on the first image, thereby improving image quality.

With reference to the first aspect, in some implementations of the first aspect, the performing first image processing on the first image based on the color transformation matrix and/or the brightness parameter, to obtain a third image includes:

> performing interpolation processing on the first image based on the color transformation matrix and/or the brightness parameter, to obtain the third image.

In a possible implementation, the color transformation matrix and/or the brightness parameter may be multiplied by a matrix of the first image to obtain the third image.

With reference to the first aspect, in some implementations of the first aspect, the performing interpolation processing on the first image based on the color transformation matrix and/or the brightness parameter, to obtain the third image includes:

> performing, in first color space, the first image processing on the first image based on the color transformation matrix and/or the brightness parameter, to obtain a processed image; and
>
> performing second image processing on the processed image in the first color space, to obtain the third image, where the second image processing is a color processing algorithm in the first color space.

In this embodiment of this application, during an image signal processor processing a Raw image collected by the electronic device, when an algorithm of the first color space is executed, the first image processing may be performed first on the first image based on the color transformation matrix and/or the brightness parameter, and then another algorithm of the first color space may be executed. An image obtained by removing banding and/or a color cast image area can be obtained by performing the first image processing. In other words, a color and brightness of the image can be corrected by performing the first image processing. When accuracy of the color and the brightness is high, that the another algorithm of the first color space is executed can ensure that another algorithm process of the first color space is performed on the image with banding and/or a color cast image area removed based on the high accuracy of the color and the brightness of the image, thereby improving the image quality.

With reference to the first aspect, in some implementations of the first aspect, before the obtaining a second image, the method further includes: detecting a photographing scene in which the electronic device is located, and detecting the moving object; and detecting that the banding and/or the color cast image area are/is present in the first image.

With reference to the first aspect, in some implementations of the first aspect, the first duration is obtained based on a number of times the flicker light source flickers per second.

With reference to the first aspect, in some implementations of the first aspect, the first duration=1000/the number of times the flicker light source flickers per second.

With reference to the first aspect, in some implementations of the first aspect, the number of times the flicker light source flickers per second is related to a frequency of a working voltage of the flicker light source.

In a possible implementation, a frequency of a working voltage of the flicker light source is 50 HZ, in other words, the number of times the flicker light source flickers per second is 100, and the first duration is 10 ms. At this time, exposure time of the first image is less than 10 ms, and exposure time of the second image is an integer multiple of 10 ms.

In a possible implementation, the frequency of the working voltage of the flicker light source is 60 HZ, in other words, the number of times the flicker light source flickers per second is 120, and the first duration is 8.3 ms. At this time, the exposure time of the first image is less than 8.3 ms, and the exposure time of the second image is an integer multiple of 8.3 ms.

With reference to the first aspect, in some implementations of the first aspect, the image processing model is a convolutional neuron network.

In a possible implementation, the image processing model is HDRnet.

With reference to the first aspect, in some implementations of the first aspect, the image processing model is trained by the following methods:

> obtaining sample data, where the sample data includes a first sample image, a second sample image, and a third sample image, the second sample image includes image content and banding and/or a color cast image area of the first sample image, the third sample image has the same image content as the first sample image, and image quality of the third sample image is higher than image quality of the first sample image;
>
> inputting the first sample image and the second sample image to a to-be-trained image processing model, to obtain predicted bilateral grid data;
>
> performing interpolation processing on the second sample image based on the predicted bilateral grid data, to obtain a predicted image; and
>
> training the to-be-trained image processing model based on a difference between the predicted image and the third sample image, to obtain the image processing model.

With reference to the first aspect, in some implementations of the first aspect, the electronic device includes an image signal processor, and the first image is an image output by the image signal processor.

In this embodiment of this application, the first image may be the image output by the image signal processor. Because the first image is the image output by a signal processor, the image signal processor may perform denoising processing on a short-exposed Raw image. Therefore, although the first image includes the banding, image details in the first image are rich.

With reference to the first aspect, in some implementations of the first aspect, the second image is an image obtained by performing third image processing on a Raw image collected by the electronic device, and the third image processing includes color space transformation processing.

It should be understood that in this embodiment of this application, the second image is a normally exposed image. For example, the second image may be an image obtained by performing downsampling and color space transformation processing on a normally exposed Raw image. In this embodiment of this application, because color information and brightness information in the second image are needed to be used to perform transfer processing on the first image, a requirement for detailed information in the second image is low, in other words, the second image does not need to be processed by the image signal processor.

According to a second aspect, an electronic device is provided. The electronic device includes one or more processors and a memory. The memory is coupled to the one or more processors. The memory is configured to store computer program code. The computer program code includes computer instructions, and the one or more processors invoke the computer instructions to enable the electronic device to perform the following steps:

> running a camera application in the electronic device;

displaying a first image, where the first image is an image of a photographed object collected based on first exposure time, the photographed object is a moving object, the first exposure time is less than first duration, and the first image includes banding and/or a color cast image area;

detecting a first operation, where the first operation indicates the electronic device to take a photo or a video;

obtaining a second image in response to the first operation, where the second image is an image of the photographed object collected based on second exposure time, and the second exposure time is an integer multiple of the first duration;

obtaining a color transformation matrix and/or a brightness parameter based on the first image and the second image, where the color transformation matrix is used for adjusting a color of the first image, and the brightness parameter is used for adjusting brightness of the first image;

performing first image processing on the first image based on the color transformation matrix and/or the brightness parameter, to obtain a third image, where the third image is an image obtained by removing the banding and/or the color cast image area; and displaying or saving the third image.

With reference to the second aspect, in some implementations of the second aspect, the one or more processors invoke the computer instructions to enable the electronic device to perform the following steps:

inputting the first image and the second image to an image processing model to obtain bilateral grid data, where the image processing model is configured to perform color transfer processing and brightness transfer processing on the first image by using the second image as a reference, the bilateral grid data includes the color transformation matrix and/or the brightness parameter, and a size of the first image is the same as a size of the second image.

With reference to the second aspect, in some implementations of the second aspect, the one or more processors invoke the computer instructions to enable the electronic device to perform the following steps:

performing interpolation processing on the first image based on the color transformation matrix and/or the brightness parameter, to obtain the third image.

With reference to the second aspect, in some implementations of the second aspect, the one or more processors invoke the computer instructions to enable the electronic device to perform the following steps:

performing, in first color space, the first image processing on the first image based on the color transformation matrix and/or the brightness parameter, to obtain a processed image; and performing second image processing on the processed image in the first color space, to obtain the third image, where the second image processing is a color processing algorithm in the first color space.

With reference to the second aspect, in some implementations of the second aspect, the one or more processors invoke the computer instructions to enable the electronic device to perform the following steps: detecting a photographing scene in which the electronic device is located, and detecting the moving object; and detecting that the banding and/or the color cast image area are/is present in the first image.

With reference to the second aspect, in some implementations of the second aspect, the first duration is obtained based on a number of times the flicker light source flickers per second.

With reference to the second aspect, in some implementations of the second aspect, the first duration=1000/the number of times the flicker light source flickers per second.

With reference to the second aspect, in some implementations of the second aspect, the number of times the flicker light source flickers per second is related to a frequency of a working voltage of the flicker light source.

With reference to the second aspect, in some implementations of the second aspect, the image processing model is a convolutional neuron network.

With reference to the second aspect, in some implementations of the second aspect, the image processing model is trained by the following methods:

obtaining sample data, where the sample data includes a first sample image, a second sample image, and a third sample image, the second sample image includes image content and banding and/or a color cast image area of the first sample image, the third sample image has the same image content as the first sample image, and image quality of the third sample image is higher than image quality of the first sample image;

inputting the first sample image and the second sample image to a to-be-trained image processing model, to obtain predicted bilateral grid data;

performing interpolation processing on the second sample image based on the predicted bilateral grid data, to obtain a predicted image; and training the to-be-trained image processing model based on a difference between the predicted image and the third sample image, to obtain the image processing model.

With reference to the second aspect, in some implementations of the second aspect, the electronic device includes an image signal processor, and the first image is an image output by the image signal processor.

With reference to the second aspect, in some implementations of the second aspect, the second image is an image obtained by performing third image processing on a Raw image collected by the electronic device, and the third image processing includes color space transformation processing.

According to a third aspect, an electronic device is provided, including modules/units configured to perform the image processing method according to any one of the first aspect or the implementations of the first aspect.

According to a fourth aspect, an electronic device is provided. The electronic device includes one or more processors and a memory. The memory is coupled to the one or more processors. The memory is configured to store computer program code. The computer program code includes computer instructions, and the one or more processors invoke the computer instructions to enable the electronic device to perform the image processing method according to any one of the first aspect or the implementations of the first aspect.

According to a fifth aspect, a chip system is provided. The chip system is used in an electronic device. The chip system includes one or more processors. The processors are configured to invoke computer instructions to enable the electronic device to perform the image processing method according to any one of the first aspect or the first aspect.

According to a sixth aspect, a computer-readable storage medium is provided. The computer-readable storage medium has computer program code stored thereon, and when the computer program code is executed by an electronic device, the electronic device is enabled to perform the image processing method according to any one of the first aspect or the implementations of the first aspect.

According to a seventh aspect, a computer program product is provided. The computer program product includes computer program code. When the computer program code is run by an electronic device, the electronic device is enabled to perform the image processing method according to any one of the first aspect or the implementations of the first aspect.

A light source of a photographing environment in which the electronic device is located is a flicker light source. When the electronic device needs to shorten exposure time during photographing a moving item, resulting in banding (for example, banding and/or a color cast image area) in an image, in this embodiment of this application, color transfer and brightness transfer are performed on a short-exposed image by using a normally exposed image as a reference, to obtain a color transformation matrix and/or a brightness parameter; the banding in the short-exposed image is removed based on the color transformation matrix and/or the brightness parameter; and it is ensured that banding in an image is removed during collecting the image of the moving photographed object at a moment of motion to improve image quality.

In addition, in this embodiment of this application, the color transformation matrix and/or the brightness parameter are/is obtained based on the bilateral grid output by the image processing model. When the image processing model performs the color transfer and brightness transfer on the first image, a deviation area between the first image and a second image having a large difference in image content can be identified, in other words, the image processing model can identify a ghost area between the second image and the first image. Therefore, the color transformation matrix and/or the brightness parameter are/is obtained by using the image processing model, so that a ghost area does not be introduced when color adjustment and/or brightness adjustment are/is performed on the first image, thereby improving image quality.

BRIEF DESCRIPTION OF THE DRAWINGS

FIG. 3 is a schematic diagram of an application scenario to which an embodiment of this application is applicable to;

FIG. 5 is a schematic flowchart of an image processing method according to an embodiment of this application;

FIG. 7 is a schematic flowchart of an image processing method according to an embodiment of this application;

FIG. 8 is a schematic flowchart of a training method for an image processing model according to an embodiment of this application;

DETAILED DESCRIPTION OF ILLUSTRATIVE EMBODIMENTS

Figure 1:
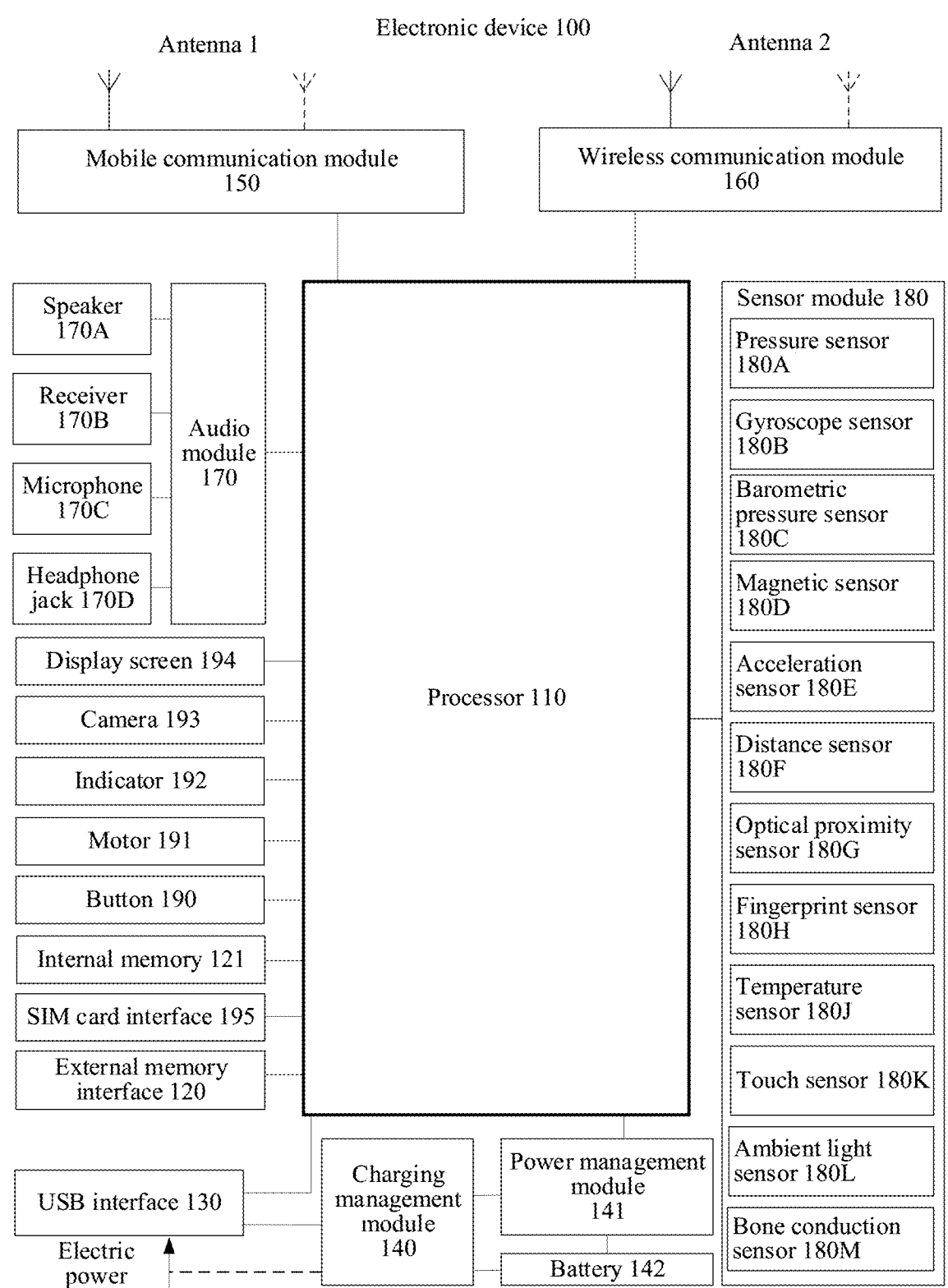
FIG. 1 is a schematic diagram of a hardware system applicable to an electronic device of this application.

In embodiments of this application, the following terms such as "first" and "second" are merely used for description, and should not be understood as indicating or implying relative importance or implicitly indicating a quantity of technical features that are indicated. Therefore, features defining "first" and "second" may explicitly or implicitly include one or more such features. In the descriptions of embodiments, unless otherwise stated, "a plurality of" means two or more.

For ease of understanding of embodiments of this application, first, a brief description of the related concepts involved in embodiments of this application is provided.

1. Flicker (Flicker)

Energy transmitted in an alternating current power network is not stable and unchanged, but changes with a fixed frequency. This frequency is generally called power frequency. An energy change caused by the power frequency is called flicker.

2. Image Banding (Banding)

In a photographing environment of a flicker light source, a phenomenon that an image sensor in an electronic device captures a flicker and banding formed on an image is called an image banding phenomenon, usually being referred to as banding.

For example, for a 50 HZ alternating current, that is, a charged light source that flickers 100 times per second, if exposure time of the electronic device satisfies an integer multiple of 10 ms, an exposure integration period may offset the banding; and if the exposure time of the electronic device does not satisfy the integer multiple of 10 ms, a light inlet amount during collecting the image may fluctuate according to an alternating current sine wave pattern, resulting in regular banding in the image.

3. Bilateral Grid (Bilateral Grid)

A bilateral grid is essentially a data structure. For example, for a single-channel grayscale value, the bilateral grid may be a three-dimensional array obtained by combining two-dimensional spatial domain information and one-dimensional grayscale information of an image.

4. Exposure Time

Exposure time refers to time for light to hit a film or photoreceptor from when a camera shutter opens to when the camera shutter closes.

5. Neural Network

A neural network is a network formed by connecting a plurality of individual neural units together, that is, an output of one neural unit may be an input of another neural unit. An input of each neural unit can be connected to a local receptive field of a previous layer, to extract a feature of the local receptive field. The local receptive field may be an area including several neural units.

6. Convolutional Neuron Network (Convolutional Neuron Network, CNN)

A convolutional neuron network is a deep neural network with a convolutional structure. The convolutional neuron network includes a feature extractor including a convolutional layer and a subsampling layer, where the feature extractor may be considered as a filter. The convolutional layer refers to a neuron layer that convolves an input signal in the convolutional neuron network. In the convolutional layer of the convolutional neuron network, a neuron may be connected to only some neurons of an adjacent layer. The convolutional layer usually includes several feature maps. Each feature map may include some neural units arranged in a rectangular. Neural units of the same feature map share a weight. The shared weight herein is a convolution kernel. Sharing a weight may be understood as a manner of extracting image information and is unrelated to positions. The convolution kernel may be initialized in the form of a matrix of a random size. During training of the convolutional neuron network, the convolution kernel may obtain a proper weight by learning. In addition, a direct benefit of sharing a weight is to reduce connections between the layers of the convolutional neuron network while reducing a risk of overfitting.

7. HDRnet

HDRNet is a typical 3D interpolation grid. For example, the interpolation grid may be divided into 16×16 in a spatial domain and into 8 ranges in a value domain.

8. Back Propagation Algorithm

A neural network may use an error back propagation (back propagation, BP) algorithm to correct values of parameters in an initial neural network model in a training process, to reduce a reconstruction error loss of the neural network model. Specifically, an error loss is generated if an input signal is transmitted forward until the input signal is output, and a parameter in the initial neural network model is updated by using back propagation error loss information, so that the error loss converges. The back propagation algorithm is a back propagation movement dominated by an error loss, and aims to obtain an optimal parameter of the neural network model, such as a weight matrix.

The following describes an image processing method and an electronic device provided in embodiments of this application with reference to the accompanying drawings.

FIG. 1 shows a hardware system applicable to an electronic device of this application.

The electronic device 100 may be a mobile phone, a smart screen, a tablet personal computer, a wearable electronic device, a vehicle-mounted electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like. A specific type of the electronic device 100 is not limited in embodiments of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that a structure shown in FIG. 1 does not constitute a specific limitation on the electronic device 100. In some other embodiments of this application, the electronic device 100 may include more or fewer components than the components shown in FIG. 1, or the electronic device 100 may include a combination of some components in the components shown in FIG. 1, or the electronic device 100 may include sub-components of some components in the components shown in FIG. 1. The components shown in FIG. 1 may be implemented by hardware, software, or a combination of software and hardware.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and a neural-network processing unit (neural-network processing unit, NPU). Different processing units may be independent components, or may be integrated components. The controller may generate an operation control signal based on instruction operation code and a timing signal, to control instruction fetching and instruction execution.

A memory configured to store instructions and data may be further disposed in the processor 110. In some embodiments, the memory in the processor 110 is a cache memory. The memory may store instructions or data recently used or cyclically used by the processor 110. If the processor 110 needs to use the instructions or the data again, the processor 110 may directly invoke the instructions or the data from the memory. Repeated access is avoided, and waiting time of the processor 110 is reduced, thereby improving efficiency of the system.

In some embodiments, the processor 110 may include one or more interfaces. For example, the processor 110 may include at least one of the following interfaces: an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM interface, and a USB interface.

For example, in this embodiment of this application, the processor 110 may be configured to perform the image processing method provided in embodiments of this application: for example, running a camera application in the electronic device; displaying a first image, where the first image is an image of a photographed object collected based on first exposure time, the photographed object is a moving object, the first exposure time is less than first duration, and the first image includes banding and/or a color cast image area; detecting a first operation, where the first operation indicates the electronic device to take a photo or a video; obtaining a second image in response to the first operation, where the second image is an image of the photographed object collected based on second exposure time, and the second exposure time is an integer multiple of the first duration; obtaining a color transformation matrix and/or a brightness parameter based on the first image and the second image, where the color transformation matrix is used for adjusting a color of the first image, and the brightness parameter is used for adjusting brightness of the first image; performing first image processing on the first image based on the color transformation matrix and/or the brightness parameter, to obtain a third image, where the third image is an image obtained by removing the banding and/or the color cast image area; and displaying or saving the third image.

A connection relationship between modules shown in FIG. 1 is only schematically described, and does not constitute a limitation on the connection relationship between the modules of the electronic device 100. Optionally, the modules of the electronic device 100 may alternatively use a combination of a plurality of connection manners in the foregoing embodiment.

A wireless communication function of the electronic device 100 may be implemented by using components such as the antenna 1, the antenna 2, the mobile communication module 150, the wireless communication module 160, the modem processor, and the baseband processor.

The antenna 1 and the antenna 2 are configured to transmit and receive electromagnetic wave signals. Each antenna of the electronic device 100 may be configured to cover one or more communication frequency bands. Different antennas may be further multiplexed to improve utilization of the antennas. For example, the antenna 1 may be multiplexed as a diversity antenna of a wireless local area network. In some other embodiments, the antenna may be used with a tuning switch.

The electronic device 100 may implement a display function by using the GPU, the display screen 194, and the application processor. The GPU is a microprocessor for image processing and is connected to the display screen 194 and the application processor. The GPU is configured to perform mathematical and geometric calculation for graphics rendering. The processor 110 may include one or more GPUs that execute program instructions to generate or change display information.

The display screen 194 may be configured to display an image or a video.

Optionally, the display screen 194 may be configured to display an image or a video. The display screen 194 includes a display panel. The display panel may use a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini light-emitting diode (mini light-emitting diode, mini LED), a micro light-emitting diode (micro light-emitting diode, Micro LED), a micro OLED (Micro OLED), or a quantum dot light emitting diode (quantum dot light emitting diodes, QLED). In some embodiments, the electronic device 100 may include 1 or N display screens 194. N is a positive integer greater than 1.

For example, the electronic device 100 may implement a photographing function by using the ISP, the camera 193, the video codec, the GPU, the display screen 194, the application processor, and the like.

For example, the ISP is configured to process data fed back by the camera 193. For example, during photographing, a shutter is enabled. Light is transferred to a camera photosensitive element by a camera, and an optical signal is converted into an electrical signal. The camera photosensitive element transfers the electrical signal to the ISP for processing, and therefore, the electrical signal is converted into an image visible to a naked eye. The ISP may perform algorithm optimization on noise, brightness, and a color of the image, and the ISP may further optimize a parameter such as exposure and a color temperature of a photographing scene. In some embodiments, the ISP may be disposed in the camera 193.

For example, the camera 193 (also referred to as a lens) is configured to capture a still image or a video. The camera 193 may be triggered to be on by using an application instruction, to implement a photographing function, for example, capturing an image in any scene. The camera may include an imaging lens, a filter, an image sensor, and another component. Light emitted or reflected by an object enters the imaging lens, passes through the filter, and finally converges on the image sensor. The imaging lens is mainly configured to converge and image light emitted or reflected by all objects (which may also be referred to as a to-be-photographed scene or a target scene, or may be understood as a scene image that a user expects to perform photographing) in an angle of view for photographing. The filter is mainly configured to filter out a redundant light wave (for example, a light wave other than visible light, for example, infrared) in light. The image sensor may be a charge coupled device (charge coupled device, CCD) or a complementary metal-oxide-semiconductor (complementary metal-oxide-semiconductor, CMOS) phototransistor. The image sensor is mainly configured to perform optical-to-electrical conversion on a received optical signal, to convert the optical signal into an electrical signal, and then transmit the electrical signal to the ISP to convert the electrical signal into a digital image signal. The ISP outputs the digital image signal to the DSP for processing. The DSP converts the digital image signal into an image signal in a standard format such as RGB and YUV.

For example, the digital signal processor is configured to process a digital signal, and can process another digital signal in addition to the digital image signal. For example, when the electronic device 100 selects a frequency, the digital signal processor is configured to perform Fourier transform and the like on frequency energy.

For example, the video codec is configured to compress or decompress a digital video. The electronic device 100 may support one or more video codecs. In this way, the electronic device 100 may play or record a video in a plurality of encoding formats, for example, moving picture experts group (moving picture experts group, MPEG) 1, MPEG 2, MPEG 3, and MPEG 4.

For example, the gyroscope sensor 180B may be configured to determine a motion posture of the electronic device 100. In some embodiments, angular velocities of the electronic device 100 around three axes (that is, x-axis, y-axis, and z-axis) may be determined by using the gyroscope sensor 180B. The gyroscope sensor 180B may be configured for image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 by performing reverse motion, to implement image stabilization. The gyroscope sensor 180B may be further used in scenarios such as navigation and a motion sensing game.

For example, the acceleration sensor 180E may detect acceleration of the electronic device 100 in all directions (generally in the x-axis, the y-axis, and the z-axis). When the electronic device 100 is still, a magnitude and a direction of gravity may be detected. The acceleration sensor 180E may be further configured to identify an attitude of the electronic device 100 as an input parameter of an application such as switching between horizontal and vertical screens or a pedometer.

For example, the distance sensor 180F is configured to measure a distance. The electronic device 100 may measure a distance by infrared light or laser. In some embodiments, for example, in a photographing scene, the electronic device 100 may measure a distance by using the distance sensor 180F, to implement quick focusing.

For example, the ambient light sensor 180L is configured to sense ambient light brightness. The electronic device 100 may adaptively adjust brightness of the display screen 194 based on the sensed ambient light brightness. The ambient light sensor 180L may be further configured to automatically adjust white balance during photographing. The ambient light sensor 180L may further cooperate with the optical proximity sensor 180G to detect whether the electronic device 100 is in a pocket to prevent an accidental touch.

For example, the fingerprint sensor 180H is configured to collect a fingerprint. The electronic device 100 may implement functions such as unlocking, accessing an application lock, photographing, and receiving a call by using features of the collected fingerprint.

For example, the touch sensor 180K is also referred to as a touch device. The touch sensor 180K may be disposed on the display screen 194. The touch sensor 180K and the display screen 194 form a touchscreen, and the touchscreen is also referred to as a touch control screen. The touch sensor 180K is configured to detect a touch operation performed on or near the touch sensor 180K. The touch sensor 180K may transmit the detected touch operation to the application processor, to determine a touch event type. A visual output related to the touch operation may be provided on the display screen 194. In some other embodiments, the touch sensor 180K may be alternatively disposed on a surface of the electronic device 100, and is located on a position different from that of the display screen 194.

The hardware system of the electronic device 100 is described in detail above. A software system of the electronic device 100 is described below.

Figure 2:
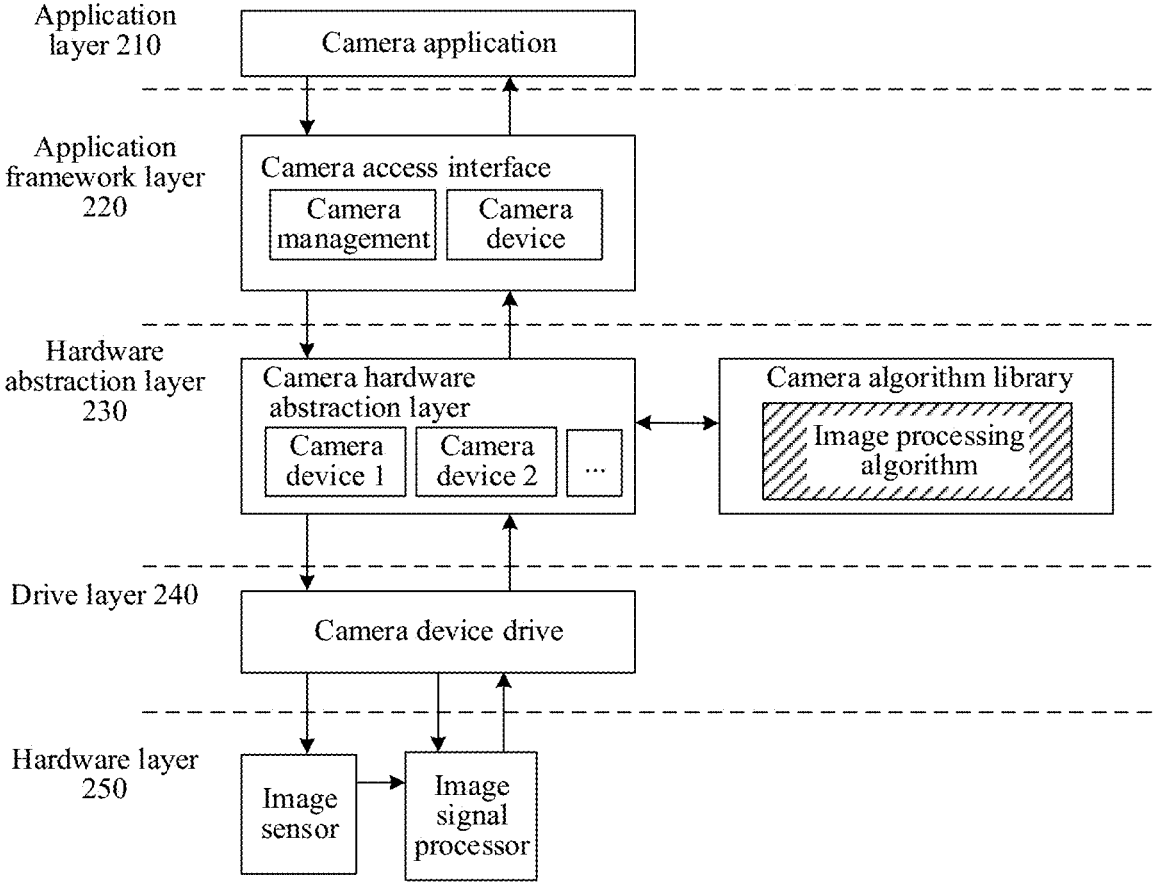
FIG. 2 is a schematic diagram of a software system applicable to an electronic device of this application.

FIG. 2 is a schematic diagram of a software system of an electronic device according to an embodiment of this application.

As shown in FIG. 2, a system architecture may include an application layer 210, an application framework layer 220, a hardware abstraction layer 230, a drive layer 240, and a hardware layer 250.

The application layer 210 may include a camera application.

Optionally, the application layer 210 may further include applications such as Gallery, Calendar, Phone, Maps, Navigation, WLAN, Bluetooth, Music, Video, and Messages.

The application framework layer 220 provides an application programming interface (application programming interface, API) and a programming framework for an application at the application layer. The application framework layer may include some predefined functions.

For example, the application framework layer 220 may include a camera access interface. The camera access interface may include camera management and a camera device. The camera management may be configured to provide an access interface for camera management. The camera device may be configured to provide an interface for accessing the camera.

The hardware abstraction layer 230 is used for abstraction of hardware. For example, the hardware abstraction layer may include a camera abstraction layer and another hardware device abstraction layer. The camera abstraction layer may include a camera device 1, a camera device 2, and the like. A camera hardware abstraction layer may be connected to a camera algorithm library. The camera hardware abstraction layer may invoke an algorithm in the camera algorithm library.

For example, the camera algorithm library may include an image processing algorithm, and when the image processing algorithm is run, the image processing method provided in this embodiment of this application is performed.

The drive layer 240 is used for providing drive for different hardware devices. For example, the drive layer may include camera device drive.

The hardware layer 250 may include an image sensor, an image signal processor, and another hardware device.

Currently, when a user photographs a moving object, the user usually expects that an electronic device can capture an image of the moving object at a moment of motion. Because the photographed object is in motion, the electronic device often needs to reduce motion blur in the image. Currently, to reduce the motion blur in the image, the electronic device may usually shorten exposure time and increase a sensitivity value. However, in a photographing scene with a flicker light source (for example, a 50 HZ alternating current), shortening the exposure time may cause the exposure time to not satisfy an integer multiple of 10 ms. If the exposure time does not satisfy an integer multiple of 10 ms, an image banding (banding) problem, that is, alternately light and dark banding in the image, may occur in an image collected by the electronic device. The banding may include Luma banding and Chroma banding. The Luma banding refers to banding caused by shortening the exposure time. There is only a brightness change and no color change in the Luma banding. The Chroma banding refers to image color cast in a local area of the image. A color of the local area in the image does not match an overall color of the image, and there is red, green, or blue color cast. A reason for the Luma banding is: For the photographing scene with the flicker light source with a 50 HZ alternating current, if the exposure time of the electronic device is not the integer multiple of 10 ms, a sin wave band of an alternating current generated by the flicker light source in a photographing environment cannot offset an exposure integration period, resulting in regular banding of brightness in the collected image. A reason for the Chroma banding is: When a voltage of the flicker light source changes by 10%, color temperature of the light source may change greatly (for example, around 1000 K). Imaging of the image is related to the color temperature. Because there is a small change in a voltage of a charged light source, a large change in the color temperature may be caused. As a result, a color cast problem occurs in the image. Therefore, if there is the banding in the image, image quality may be seriously affected.

In view of this, embodiments of this application provide an image processing method and an electronic device. A light source of a photographing environment in which the electronic device is located is a flicker light source. When the electronic device needs to shorten exposure time during photographing a moving item, resulting in banding and/or a color cast image area in an image, in this embodiment of this application, color transfer and brightness transfer are performed on a short-exposed image by using a normally exposed image as a reference, to remove banding and/or a color cast image area in the short-exposed image; and it is ensured that banding and a color cast image area in an image are removed during collecting an image of a moving photographed object at a moment of motion to improve image quality.

Figure 3:
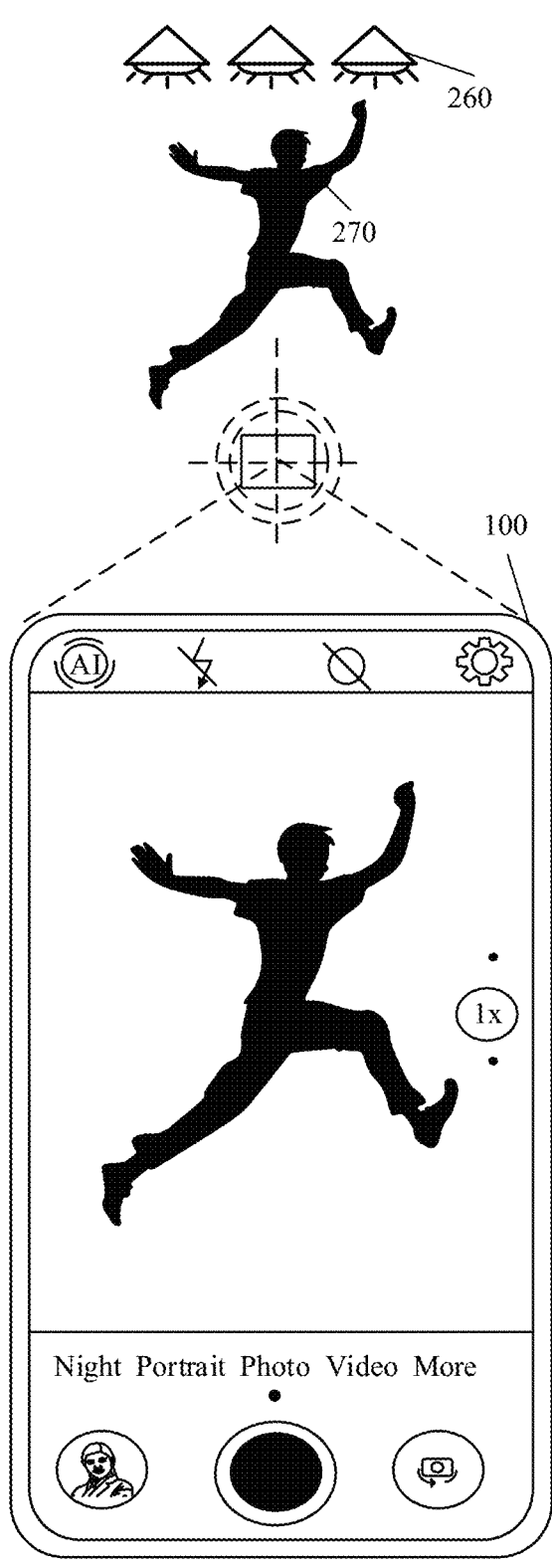

FIG. 3 is a schematic diagram of an application scenario of an image processing method according to an embodiment of this application.

For example, the image processing method in this embodiment of this application may be applied to a photographing field. For example, the image processing method of this application may be applied to photograph a moving object in a photographing environment with a flicker light source (for example, an indoor photographing environment). The moving object may refer to a moving user, a moving item, an image played in a video (for example, a movie), or the like.

For example, as shown in FIG. 3, a photographed object 270 is in motion in an indoor place with a flicker light source where an indoor lighting device (for example, an electric lamp 260) provides light. An electronic device 100 runs a camera application. During the electronic device 100 collecting an image including the photographed object 270, a preview image including the photographed object 270 may be displayed on a display screen in real time. When a user views a preview image on the display screen of the electronic device 100, if the user needs to capture an image of the photographed object 270 at a moment of motion, the user may just tap a photographing control on a photographing interface. When the photographing control of the electronic device 100 is triggered, the electronic device 100 may capture the image of the photographed object 270 at the moment of motion.

Optionally, in FIG. 3, an example in which the photographed object 270 is a user is used for description. The photographed object may alternatively be an animal, a vehicle, a robot, or the like. For example, the photographed object being in motion in the photographing environment with the flicker light source may mean that the user plays badminton or table tennis, practices yoga, or the like indoors. A photographed object in a photographing view angle of the electronic device may be one or more users.

In addition, a lighting device is needed to provide light in the indoor place. The lighting device may operate on an alternating current. For example, the lighting device is a fluorescent lamp. A working principle of the fluorescent lamp is: A noble gas inside a lamp tube discharges at a high-voltage current, electrons generated by the discharge reach the lamp tube of the fluorescent lamp, and then the fluorescent lamp emits light. For example, the fluorescent lamp operates on a 50 Hz alternating current. When the fluorescent lamp operates on the alternating current, the fluorescent lamp flickers 100 times in one second on the 50 Hz alternating current.

Optionally, for example, the fluorescent lamp operates on a 60 Hz alternating current. When the fluorescent lamp operates on the alternating current, the fluorescent lamp flickers 120 times in one second on the 60 Hz alternating current.

Figure 4:
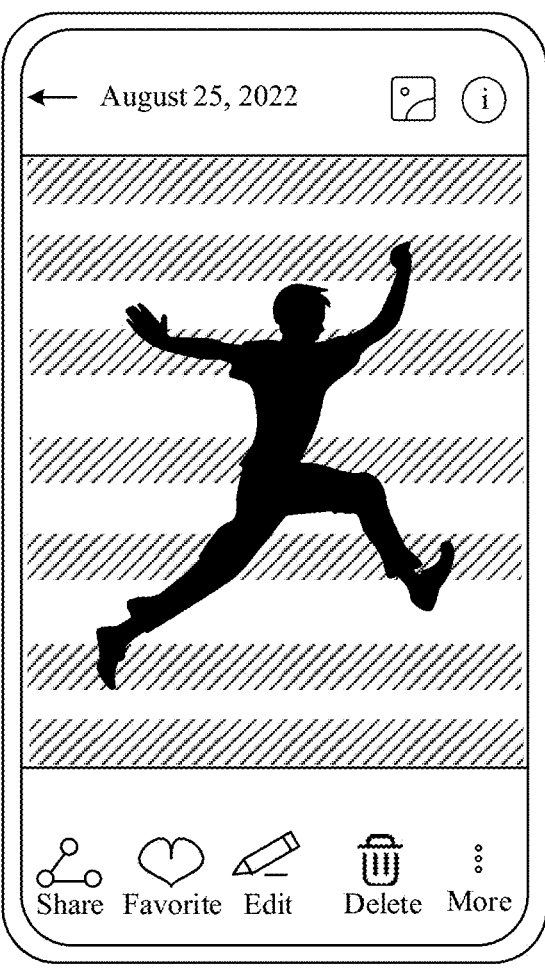
FIG. 4 is a schematic diagram of a graphical user interface applicable to an embodiment of this application.

For example, in this embodiment of this application, when the electronic device is in a photographing mode, a display screen of the electronic device may display a preview image. When the photographing control of the electronic device is triggered, the electronic device may generate a snapped image (also referred to as a captured image). When the electronic device photographs the photographed object at the moment of motion, the flicker of the light source in a photographing scene may affect an image collected by an image sensor, resulting in banding in an image in a preview image stream, and/or resulting in banding in an image collected by the electronic device, for example, as shown in FIG. 4.

The image processing method in this embodiment of this application may be applied to a photographing mode of a camera application. According to the image processing method provided in this embodiment of this application, when the electronic device is in the photographing environment with the flicker light source to photograph a moving item, the banding and the color cast image area in the image can be removed, and color accuracy and brightness accuracy of the image can be improved, so that image quality is improved.

For example, when the camera application is in a preview state (for example, photographing preview), the preview image displayed by the electronic device includes banding. After the photographing control of the electronic device is triggered, the image processing method provided in this embodiment of this application may be performed to obtain an image with banding removed. Removing image banding may refer to removing local color cast in the image (for example, Chroma banding), and/or removing alternately light and dark banding in the image (for example, Luma banding).

Optionally, when the electronic device has sufficient computing power, the image processing method in this embodiment of this application may be further applied to the field of video recording, a video call, or other image processing.

For example, a video call scenario may include but is not limited to the following scenarios:

a video call, a video meeting application, a long/short video application, a video livestreaming application, an online video course application, an application scenario in which intelligent camera movement is performed for portrait photography, recording a video by using a recording function of a system camera, video monitoring, intelligent cat eye, or another portrait photographing scenario.

It should be understood that the above is an example of describing the application scenarios, and does not limit the application scenarios of this application.

The following describes in detail the image processing method provided in embodiments of this application with reference to FIG. 6 to FIG. 12.

FIG. 5 is a schematic flowchart of an image processing method according to an embodiment of this application. The method 300 may be performed by the electronic device shown in FIG. 1. The method 300 includes step S310 to step S350. The following describes step S310 to step S350 in detail separately.

It should be understood that the method shown in FIG. 5 is applied to the electronic device, and a light source of a photographing environment in which the electronic device is located is a flicker light source. Because a light source in the solutions of this application is a flicker light source, there may be banding in the image when exposure time of the electronic device when an image is obtained does not satisfy an integer multiple of (1000/a number of times the light source flickers per second) milliseconds.

Step S310: Run a camera application of the electronic device.

For example, a user may indicate the electronic device to run the camera application by taping an icon of the "Camera" application. Alternatively, when the electronic device is in a lock screen state, by performing a right-sliding gesture on a display screen of the electronic device, the user may indicate the electronic device to run the camera application. Alternatively, the electronic device is in a lock screen state, a lock screen interface includes the icon of the camera application, and by tapping the icon of the camera application, the user indicates the electronic device to run the camera application. Alternatively, when the electronic device is running another application, the application has a permission to invoke the camera application, and by tapping a corresponding control, the user may indicate the electronic device to run the camera application. For example, when the electronic device is running an instant messaging application, by selecting a control of a camera function, the user may indicate the electronic device to run the camera application.

It should be understood that the above is an example of an operation of running the camera application, and the electronic device may be further indicated to run the camera application through a voice instruction operation or another operation. This is not limited in this application.

It should be further understood that running the camera application may refer to starting the camera application.

Step S320: Display a first image, where the first image includes banding and/or a color cast image area.

The first image is an image of a photographed object collected based on first exposure time, the photographed object is a moving object, and the first exposure time is less than first duration.

Optionally, the first image may include banding, to be specific, the first image includes Luma banding.

Optionally, the first image may include the banding and the color cast image area, to be specific, the first image includes Luma banding and Chroma banding.

It should be understood that the Luma banding refers to banding caused by shortening the exposure time. There is only a brightness change and no color change in the Luma banding. A reason for the Luma banding is: A sin wave band of an alternating current generated by the flicker light source in a photographing environment cannot offset an exposure integration period, resulting in regular banding of brightness in the collected image.

It should be understood that the Chroma banding refers to image color cast in a local area of the image. A color of the local area in the image does not match an overall color of the image, and there is red, green, blue, or another color cast. A reason for the Chroma banding is: At the same time as energy changes, color temperature also changes, resulting in a color cast problem in the image. For example, if there are different colors in alternately light and dark banding in the Luma banding, there is the Chroma banding in the image.

It should be further understood that the banding may refer to global banding, in other words, there is the alternately light and dark banding in an entire area of the image. The color cast image area may refer to local banding, in other words, there is the local color cast area in the image, and the color of the color cast area does not match the overall color of the image. For example, the color cast may be red, green, or blue color cast.

It should be further understood that because the exposure time of the first image is shorter than the first duration, the exposure integration period cannot offset the banding. Therefore, there may be the banding in the first image. In addition, when a voltage of the flicker light source changes by 10%, color temperature of the light source may change greatly (for example, around 1000 K). Imaging of the image is related to the color temperature. Because there is a small change in a voltage of a charged light source, a large change in the color temperature may be caused. As a result, the color cast problem occurs in the image.

Figure 10A:
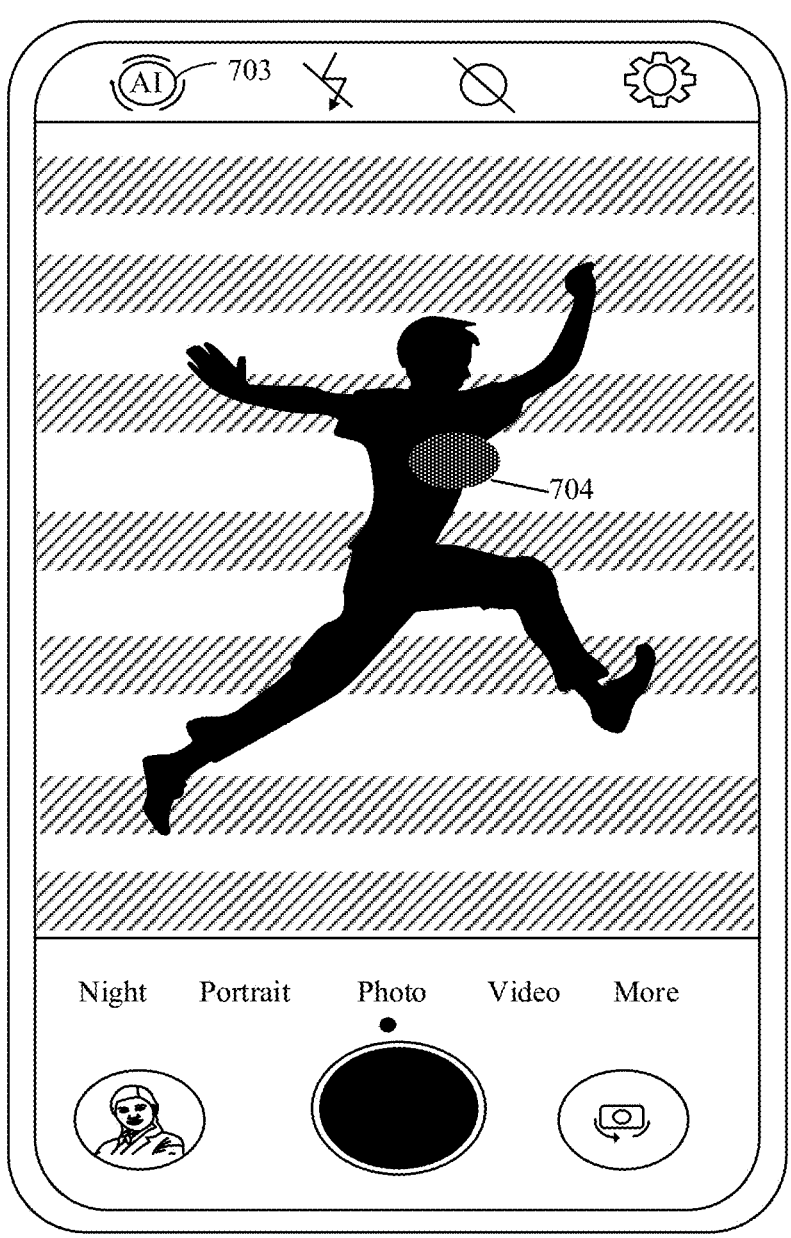
FIG. 10A and FIG. 10B are a schematic diagram of a graphical user interface applicable to an embodiment of this application.

For example, the first image may be an image as shown in FIG. 10A, and the image includes alternately light and dark banding and a color cast image area 704. The image area 704 may refer to a color cast image area of red, green, blue, or another color.

Optionally, the first image may refer to a preview image in a preview interface in the electronic device. The preview interface may refer to a photographing preview interface or a video recording preview interface.

Step S330: Detect a first operation, where the first operation indicates the electronic device to take a photo or a video.

Figure 11A:
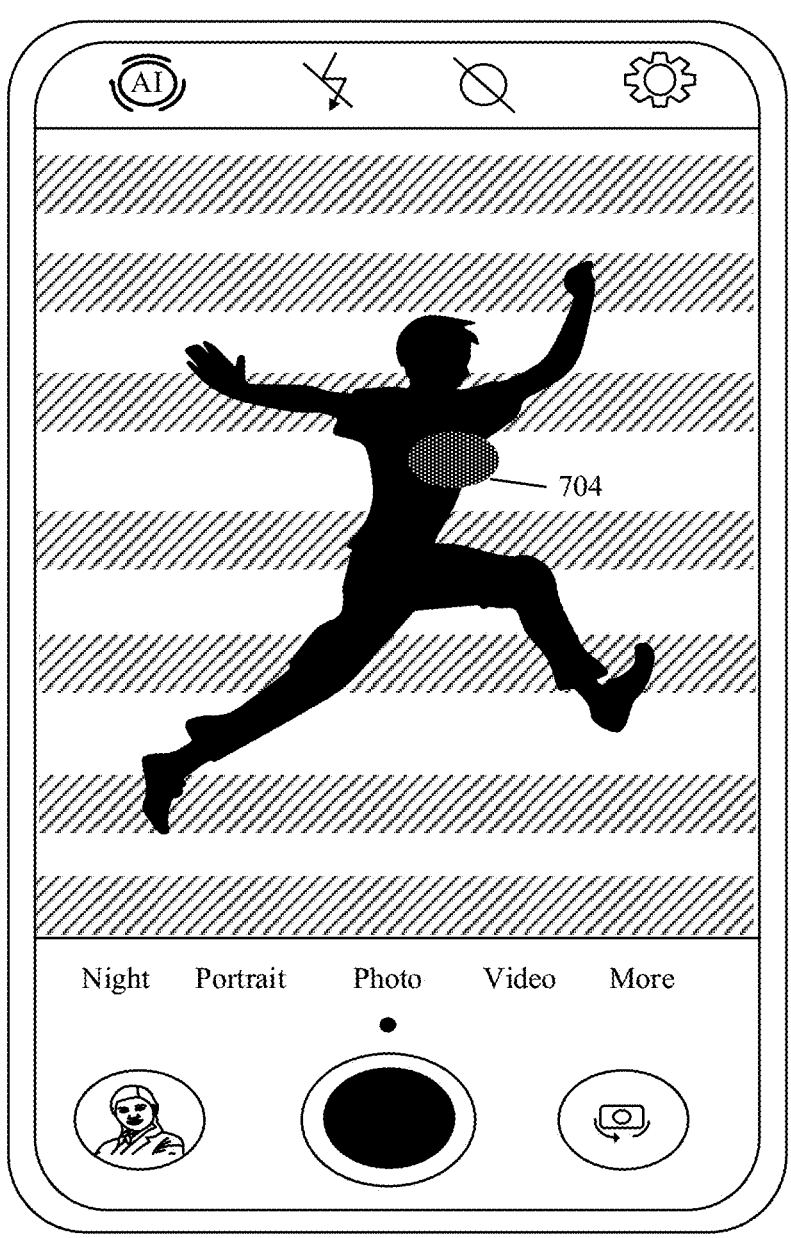
FIG. 11A to FIG. 11D are a schematic diagram of a graphical user interface applicable to an embodiment of this application.
Figure 11B:
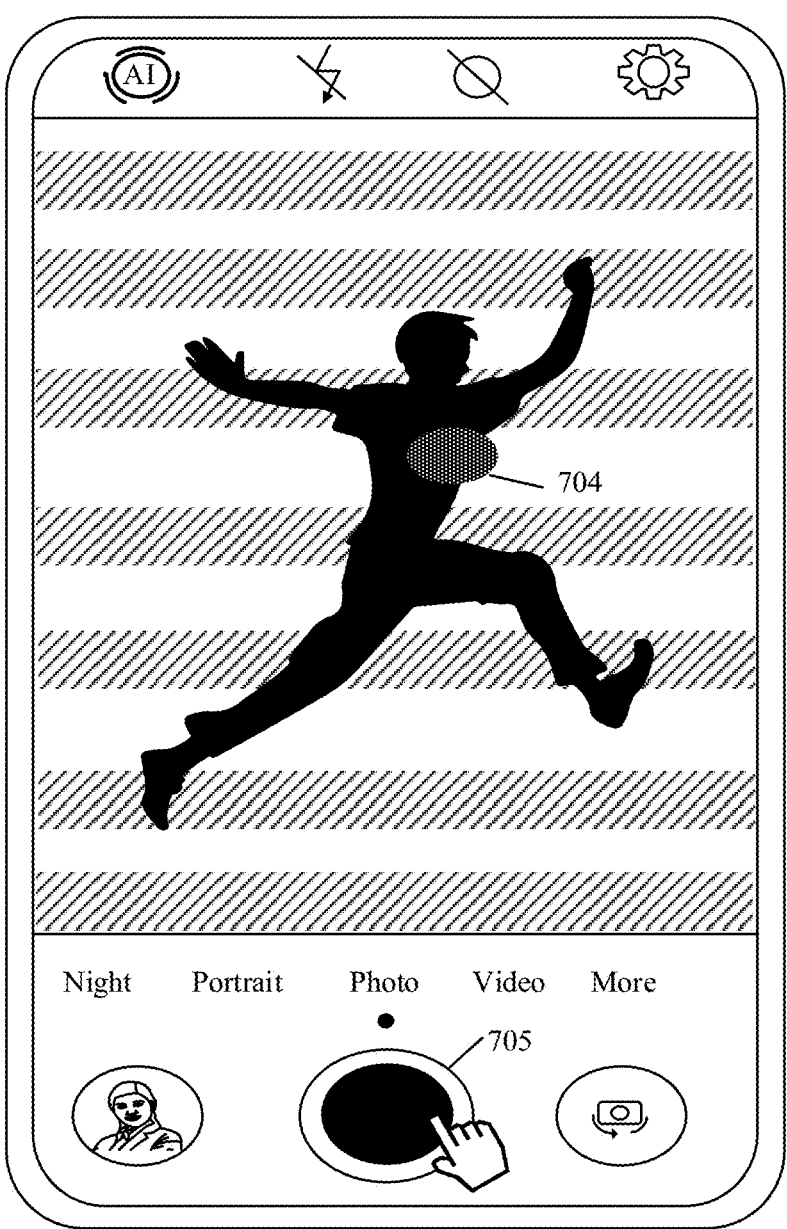

For example, when the camera application is in a photographing mode, the first operation may refer to an operation of tapping a photographing control, as shown in FIG. 11B.

For example, when the camera application is in a video recording mode, the first operation may refer to an operation of tapping a video recording control. It should be understood that the above is an example of the first operation, and the electronic device may be further indicated to take a photo or a video through a voice instruction operation or another operation. This is not limited in this application.

Optionally, the moving object may refer to a moving user, a moving item, an image played in a video (for example, a movie), or the like.

Optionally, the electronic device includes an image signal processor, and the first image may be an image output by the image signal processor.

In this embodiment of this application, the first image may be the image output by the image signal processor. Because the first image is the image output by a signal processor, the image signal processor may perform denoising processing on a short-exposed Raw image. Therefore, although the first image includes the banding, image details in the first image are rich.

Step S340: Obtain a second image in response to the first operation.

The second image is an image of the photographed object collected based on second exposure time, and the second exposure time is an integer multiple of the first duration.

It should be understood that because the exposure time of the second image is the integer multiple of the first duration, an exposure integration period can offset the banding. Therefore, there may be no banding in the second image.

For example, for a flicker light source with a 50 HZ alternating current, the exposure time of the second image may be an integer multiple of 10 ms.

It should be understood that because the exposure time of the second image satisfies the integer multiple of the first duration, each row of pixels in the second image receives the same energy, and there may be no energy fluctuation or color cast problem in the second image. Therefore, there may be no banding and color cast image area in the second image, in other words, there is no Luma banding and Chroma banding in the second image.

Optionally, the first duration is obtained based on a number of times the flicker light source flickers per second.

Optionally, the number of times the flicker light source flickers per second is related to a frequency of a working voltage of the flicker light source.

For example, the first duration=1000/the number of times the flicker light source flickers per second.

For example, the frequency of the working voltage of the flicker light source is 50 HZ, in other words, the number of times the flicker light source flickers per second is 100, and the first duration is 10 ms. At this time, the exposure time of the first image is less than 10 ms, and the exposure time of the second image is an integer multiple of 10 ms.

For example, the frequency of the working voltage of the flicker light source is 60 HZ, in other words, the number of times the flicker light source flickers per second is 120, and the first duration is 8.3 ms. At this time, the exposure time of the first image is less than 8.3 ms, and the exposure time of the second image is an integer multiple of 8.3 ms.

It should be understood that the above is an example of the first duration. The first duration is not limited in this application.

Optionally, the second image is an image obtained by performing third image processing on a Raw image collected by the electronic device, and the third image processing includes color space transformation processing.

For example, the electronic device may collect a normally exposed Raw image, and perform the color space transformation processing on the normally exposed Raw image to obtain the second image.

For example, the second image may be an image in RGB color space, or an image in YUV color space.

It should be understood that in this embodiment of this application, the second image is a normally exposed image. For example, the second image may be an image obtained by performing downsampling and the color space transformation processing on the normally exposed Raw image. In this embodiment of this application, because color information and brightness information in the second image are needed to be used to perform transfer processing on the first image, a requirement for detailed information in the second image is low, in other words, the second image does not need to be processed by the image signal processor.

Optionally, before the obtaining a second image, the method further includes: detecting a photographing scene in which the electronic device is located, and detecting the moving object; and detecting that the banding and/or the color cast image area are/is present in the first image.

For example, the electronic device may include a detection module, and the detection module may detect the photographed object. When the photographed object includes the moving object, the detection module outputs an identifier, and the identifier may indicate that the photographing scene includes the moving object.

For example, a flicker sensor (Flicker Sensor) in the electronic device may be configured to detect whether the banding exists. The flicker sensor (Flicker Sensor) may be a sensor that samples ambient light.

In this embodiment of this application, when there is the moving object in the photographing scene and the collected image includes banding, the electronic device may be triggered to perform the image processing method provided in embodiments of this application, that is, a method for removing the banding in the image.

It should be understood that if the photographing scene includes the moving object, the electronic device collects an image of the moving object at a moment of motion. Because the photographed object is in motion, the electronic device often needs to reduce motion blur in the image. To reduce the motion blur in the image, the electronic device may usually shorten exposure time and increase a sensitivity value. However, for the photographing environment of the flicker light source, shortening the exposure time may cause banding to exist in the image, so the banding in the image needs to be processed.

Step S350: Obtain a color transformation matrix and/or a brightness parameter based on the first image and the second image.

The color transformation matrix is used for adjusting a color of the first image, and the brightness parameter is used for adjusting brightness of the first image.

In this embodiment of this application, because the second image is an image with normal exposure time, there is no banding in the second image. The color transformation matrix and the brightness parameter may be obtained by transferring a color and brightness of the second image into the first image.

Optionally, the foregoing method further includes:

inputting the first image and the second image to an image processing model to obtain bilateral grid data, where the image processing model is configured to perform color transfer processing and brightness transfer processing on the first image by using the second image as a reference, the bilateral grid data includes the color transformation matrix and/or the brightness parameter, and a size of the first image is the same as a size of the second image.

For example, the image processing model is a convolutional neuron network. For example, the image processing model may be HDRnet. Optionally, for a training method of the image processing model, refer to the following related description shown in FIG. 8.

In this embodiment of this application, the color transformation matrix and/or the brightness parameter are/is obtained based on a bilateral grid output by the image processing model. When the image processing model performs the color transfer and brightness transfer on the first image, a deviation area between the first image and a second image having a large difference in image content can be identified, in other words, the image processing model can identify a ghost area between the second image and the first image. Therefore, the color transformation matrix and/or the brightness parameter are/is obtained by using the image processing model, so that a ghost area does not be introduced when color adjustment and/or brightness adjustment are/is performed on the first image, thereby improving image quality.

Optionally, the first image and the second image may be registered and smoothed first; and a pixel-wise difference is performed between a registered first image and a registered second image, to obtain the color transformation matrix and/or the brightness parameter.

Step S360: Perform first image processing on the first image based on the color transformation matrix and/or the brightness parameter, to obtain a third image.

The third image is an image obtained by removing the banding and/or the color cast image area.

Figure 11C:
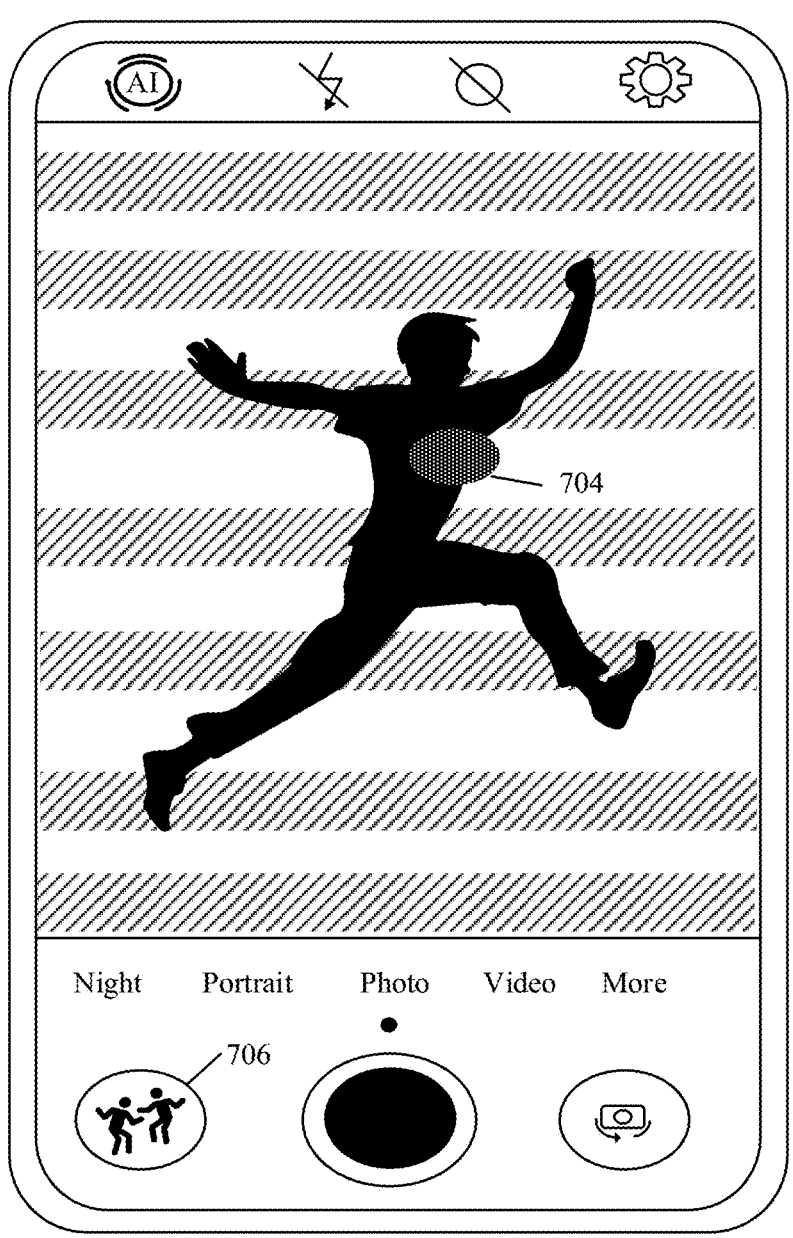

For example, the color adjustment may be performed on the first image based on the color transformation matrix, to remove the color cast image area in the first image; and the brightness adjustment may be performed on the first image based on the brightness parameter, to remove the banding in the first image. For example, as shown in FIG. 11C, an image area 704 in an image may be removed based on the color transformation matrix; and light and dark banding in the image may be removed based on the brightness parameter.

Figure 11D:
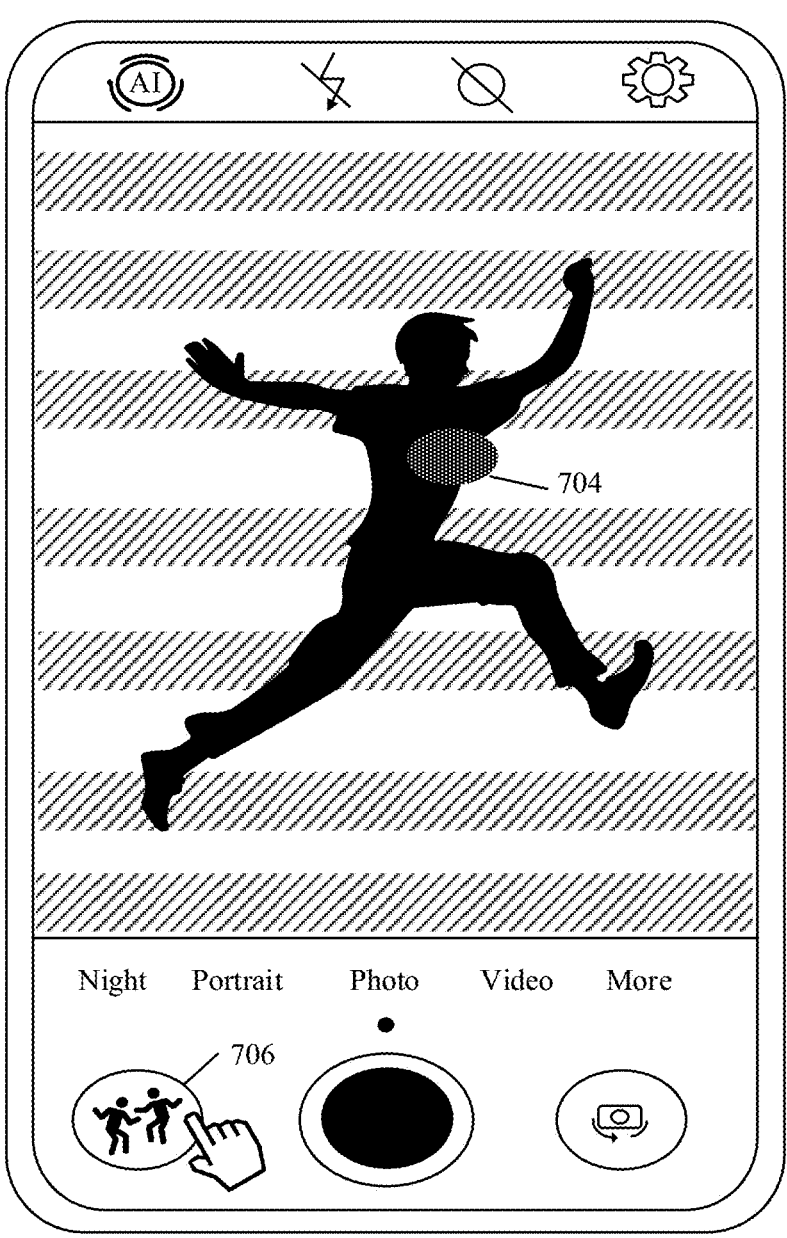
Figure 12:
FIG. 12 is a schematic diagram of a graphical user interface applicable to an embodiment of this application.

For example, the first image may be as shown in FIG. 11D, and the third image may be as shown in FIG. 12.

Optionally, the performing first image processing on the first image based on the color transformation matrix and/or the brightness parameter, to obtain a third image includes:

performing interpolation processing on the first image based on the color transformation matrix and/or the brightness parameter, to obtain the third image.

For example, the color transformation matrix and/or the brightness parameter may be multiplied by a matrix of the first image to obtain the third image.

Optionally, the performing interpolation processing on the first image based on the color transformation matrix and/or the brightness parameter, to obtain the third image includes:

performing, in first color space, the first image processing on the first image based on the color transformation matrix and/or the brightness parameter, to obtain a processed image; and performing, in the first color space, second image processing on the processed image, to obtain the third image, where the second image processing is a color processing algorithm in the first color space.

For example, the first color space may be RGB color space. In other words, the first image processing may be performed in the RGB color space.

For example, in the RGB color space, the first image processing may be performed first; and then another algorithm related to color processing in the RGB color space is performed.

In this embodiment of this application, during the image signal processor processing the Raw image collected by the electronic device, when an RGB domain algorithm is executed, the first image processing may be performed first on the first image based on the color transformation matrix and/or the brightness parameter, and then another RGB domain algorithm may be executed. An image obtained by removing banding and/or a color cast image area can be obtained by performing the first image processing. In other words, a color and brightness of the image can be corrected by performing the first image processing. When accuracy of the color and the brightness is high, executing the another RGB domain algorithm can ensure that the RGB domain algorithm processing is performed on the image with banding removed while ensuring the accuracy of the color and the brightness of the image is high, thereby improving the image quality.

For example, in the RGB color space, the first image processing may be performed first; and then another algorithm in the RGB color space is executed.

For example, the first color space may be YUV color space. In other words, the first image processing may be performed in the YUV color space.

Optionally, the image processing model is trained by the following methods:

obtaining sample data, where the sample data includes a first sample image, a second sample image, and a third sample image, the second sample image includes image content and banding and/or a color cast image area of the first sample image, the third sample image has the same image content as the first sample image, and image quality of the third sample image is higher than image quality of the first sample image;

inputting the first sample image and the second sample image to a to-be-trained image processing model, to obtain predicted bilateral grid data;

performing interpolation processing on the second sample image based on the predicted bilateral grid data, to obtain a predicted image; and training the to-be-trained image processing model based on a difference between the predicted image and the third sample image, to obtain the image processing model.

Step S370: Display or save the third image.

For example, when the electronic device is running another application, the application has a permission to invoke the camera application. The third image may be displayed when the another application invokes the camera application to obtain an image. For example, when the electronic device runs a photography mode (or the video recording mode) of the camera application, after the electronic device detects an operation indicating photographing (or an operation indicating video recording), the third image may be saved.

In this embodiment of this application, the light source of the photographing environment in which the electronic device is located is the flicker light source. When the electronic device needs to shorten exposure time during photographing a moving item, resulting in banding and/or a color cast image area in an image, in this embodiment of this application, color transfer and brightness transfer are performed on a short-exposed image by using a normally exposed image as a reference, to obtain a color transformation matrix and/or a brightness parameter. Color cast in a local image area in the short-exposed image may be removed based on the color transformation matrix; banding in the short-exposed image may be removed based on the brightness parameter; and it is ensured that banding in an image is removed (for example, banding and a color cast image area are removed) during collecting an image of the moving photographed object at a moment of motion to improve image quality.

In addition, in this embodiment of this application, the color transformation matrix and/or the brightness parameter are/is obtained based on the bilateral grid output by the image processing model. A difference in image content between the first image and the second image can be identified when the color transfer and the brightness transfer are performed on the first image by the image processing model. Therefore, the color transformation matrix and/or the brightness parameter are/is obtained by using the image processing model, so that a ghost area does not be introduced when color adjustment and/or brightness adjustment are/is performed on the first image, thereby improving image quality.

Figure 6:
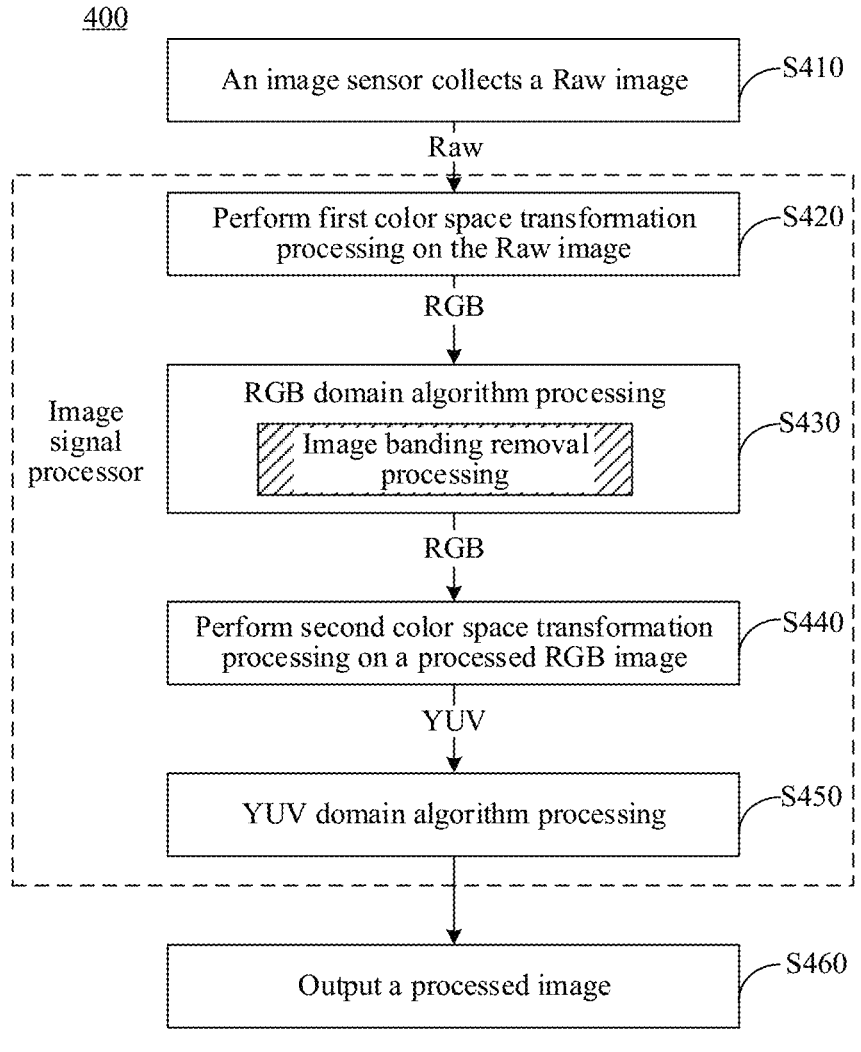
FIG. 6 is a schematic flowchart of a processing method of an image signal processor according to an embodiment of this application.

FIG. 6 is a schematic flowchart of a processing process of an image signal processor according to an embodiment of this application. The method 400 may be performed by the electronic device shown in FIG. 1. The method 400 includes step S410 to step S460. The following describes step S410 to step S460 in detail separately.

Step S410: An image sensor collects a Raw image.

It should be understood that the Raw image refers to an image in Raw color space. The Raw image may refer to original image data output from the image sensor without interpolation and color mixing.

Step S420: Perform first color space transformation processing on the Raw image.

For example, the Raw image may be transferred into RGB color space to obtain an RGB image.

Step S430: Perform RGB domain algorithm processing.

Optionally, the image processing method provided in embodiments of this application, that is, image banding removal processing (for example, processing for removing banding in an image) may be an algorithm executed first in the RGB domain algorithm processing. For example, the performing RGB domain algorithm processing on the RGB image in step S430 includes: first performing the image banding removal processing on the RGB image to obtain an RGB image with banding removed; and then performing another RGB domain algorithm processing on the RGB image with banding removed.

Optionally, the image processing method provided in embodiments of this application, that is, the image banding removal processing may be an algorithm executed first among color-related algorithms in the RGB domain algorithm processing.

In this embodiment of this application, during the image signal processor processing the Raw image collected by the electronic device, when the RGB domain algorithm is executed, the image banding removal processing may be performed first, so that accuracy of a color and brightness of the image is high. When the accuracy of the color and the brightness is high, executing the another RGB domain algorithm can ensure that the RGB domain algorithm processing is performed on the image with image banding removed while ensuring the accuracy of the color and the brightness of the image is high, thereby improving image quality.

For example, the performing RGB domain algorithm processing on the RGB image in step S430 includes: performing color-related algorithm processing and another RGB domain algorithm processing; first performing the image banding removal processing when the color-related algorithm processing is performed, to obtain the RGB image with banding removed; and then performing another color-related algorithm processing on the RGB image with banding removed.

In this embodiment of this application, before performing the color-related algorithm processing, the image processing method provided in embodiments of this application may be performed first, to be specific, the image banding removal processing may be performed. The image with banding removed can be obtained by the image banding removal processing, so that the accuracy of the color and the brightness of the image is high. When the accuracy of the color and the brightness is high, performing the color-related algorithm processing can ensure that the another color-related algorithm processing is performed on the image with banding removed while ensuring the accuracy of the color and the brightness of the image is high, thereby improving the image quality.

Optionally, in the image processing method provided in embodiments of this application, that is, the image banding removal processing, execution time for the RGB domain algorithm is not limited.

Optionally, for an implementation of the image banding removal processing, refer to step S510 to step S570 shown in FIG. 7.

Step S440: Perform second color space transformation processing on a processed RGB image.

For example, second color space may be YUV color space; the processed RGB image may be transferred into the YUV color space; and YUV domain algorithm processing is performed.

Step S450: YUV domain algorithm processing.

For example, the YUV domain algorithm processing includes but is not limited to:

brightness noise reduction processing, edge enhancement processing, contrast processing, and the like.

Step S460: Output a processed image.

It should be understood that in step S410 to step S460, an example in which the RGB domain algorithm processing includes the image banding removal processing is used as an example for description. Optionally, the image banding removal processing may alternatively be performed in a YUV domain. In other words, the image banding removal processing may alternatively be performed in step S450.

In this embodiment of this application, the image banding removal processing is added to the RGB domain algorithm processing, so that a light source of a photographing environment in which the electronic device is located is a flicker light source. When the electronic device needs to shorten exposure time during photographing a moving item, resulting in banding in an image, the banding is removed in the short-exposed image, and it is ensured that banding and a color cast image area in an image are removed during collecting an image of a moving photographed object at a moment of motion to improve image quality.

FIG. 7 is a schematic flowchart of an image processing method according to an embodiment of this application. The method 500 may be performed by the electronic device shown in FIG. 1. The method 500 includes step S501 to step S508. The following describes step S501 to step S508 in detail separately.

It should be noted that in this embodiment of this application, a light source of a photographing environment in which the electronic device is located is a flicker light source.

It should be understood that the method 500 shown in FIG. 7 may refer to a related algorithm of the image banding removal processing shown in FIG. 6.

Optionally, the method 500 shown in FIG. 7 may be an algorithm executed first in the RGB domain algorithm processing shown in FIG. 6.

In this embodiment of this application, during an image signal processor processing a Raw image collected by the electronic device, when an RGB domain algorithm is executed, the method shown in FIG. 7 may be performed first, and then another RGB domain algorithm may be executed. An image obtained by removing banding can be obtained by performing the image processing method shown in FIG. 7. In other words, a color and brightness of an image can be corrected by performing the method shown in FIG. 7. When accuracy of the color and the brightness is high, executing the another RGB domain algorithm can ensure that the RGB domain algorithm processing is performed on the image with banding removed while ensuring the accuracy of the color and the brightness of the image is high, thereby improving the image quality.

Optionally, the method 500 shown in FIG. 7 may be performed before all color-related algorithms in the RGB domain algorithm processing shown in FIG. 6.

In this embodiment of this application, before executing the color-related algorithm, the method 500 shown in FIG. 7 may be performed first. The image with banding removed can be output by performing the image processing method shown in FIG. 7. In other words, a color and brightness of an image can be corrected by performing the method shown in FIG. 7. When the accuracy of the color and the brightness is high, performing another color-related algorithm processing can ensure that another color-related processing is performed on the image with banding removed while ensuring the accuracy of the color and the brightness of the image is high, thereby improving the image quality.

Optionally, the method 500 shown in FIG. 7 may not be limited to be performed in the RGB domain algorithm shown in FIG. 6.

Optionally, the method 500 shown in FIG. 7 may be performed in the YUV domain algorithm shown in FIG. 6. This is not limited in this application.

Step S501: Run a camera application.

For example, a user may indicate the electronic device to run the camera application by taping an icon of the "Camera" application. Alternatively, when the electronic device is in a lock screen state, by performing a right-sliding gesture on a display screen of the electronic device, the user may indicate the electronic device to run the camera application. Alternatively, the electronic device is in a lock screen state, a lock screen interface includes the icon of the camera application, and by tapping the icon of the camera application, the user indicates the electronic device to run the camera application. Alternatively, when the electronic device is running another application, the application has a permission to invoke the camera application, and by tapping a corresponding control, the user may indicate the electronic device to run the camera application. For example, when the electronic device is running an instant messaging application, by selecting a control of a camera function, the user may indicate the electronic device to run the camera application.

It should be understood that the above is an example of an operation of running the camera application, and the electronic device may be further indicated to run the camera application through a voice instruction operation or another operation. This is not limited in this application.

It should be further understood that running the camera application may refer to starting the camera application.

Step S502: Detect that a photographed object includes a moving object.

For example, the electronic device may include a detection module, and the detection module may detect the photographed object. When the photographed object includes the moving object, the detection module outputs an identifier, and the identifier may indicate that the photographing scene includes the moving object.

Optionally, the moving object may refer to a moving user, a moving item, an image played in a video, or the like.

Step S503: Detect that image banding (banding) is present.

It should be understood that the image banding (banding) may include Luma banding and Chroma banding. The Luma banding refers to banding caused by shortening exposure time. There is only a brightness change and no color change in the Luma banding, for example, banding shown in FIG. 10A. The Chroma banding refers to image color cast in a local area of the image. A color of the local area in the image does not match an overall color of the image. For example, the image color cast may include red, green, blue, or another color cast, for example, an image area 704 shown in FIG. 10A.

For example, a flicker sensor (Flicker Sensor) in the electronic device may be configured to detect whether the image banding presents. The flicker sensor (Flicker Sensor) may be a sensor that samples ambient light.

Step S504: Obtain an ISP-processed short-exposed image (an example of a first image).

Optionally, the output ISP-processed short-exposed image may refer to an RGB image obtained by using a short-exposed Raw image in multi-frame Raw images as a reference.

It should be understood that because exposure time of the short-exposed image is short, the exposure time of the short-exposed image usually does not satisfy an integer multiple of 10 ms. Therefore, there is banding in the short-exposed image. In addition, when a voltage of the flicker light source changes by 10%, color temperature of the light source may change greatly (for example, around 1000 K). Imaging of the image is related to the color temperature. Because there is a small change in the voltage of the flicker light source, a large change in the color temperature may be caused. As a result, a color cast problem occurs in the image. Therefore, there may also be a color cast image area in the short-exposed image.

Optionally, Step S503 may be performed first and then step S504. Alternatively, step S504 may be performed first and then step S503. Alternatively, step S503 and step S504 may be performed at the same time. An order of step S503 and step S504 is not limited in this application.

Optionally, a full size (full size) short-exposed Raw image may be obtained, a short-exposed image obtained by performing ISP processing on a short-exposed Raw image (for example, a 512*512 RGB image).

For example, if maximum resolution supported by a camera in a camera module is 4096*2160, resolution of the obtained full size short-exposed Raw image may be 4096*2160.

Step S505: Detect a first operation indicating photographing.

Optionally, as shown in FIG. 11B, the first operation may be an operation of tapping a photographing control 705.

It should be understood that the above is an example of the first operation indicating photographing. The electronic device may be further indicated to take a photo through a voice instruction operation or another operation. This is not limited in this application.

Step S506: Obtain a normally exposed image (an example of a second image) in response to the first operation.

It should be understood that in a photographing scene with a flicker light source with an alternating current of 50 HZ, the normally exposed image may refer to a Raw image with exposure time of an integer multiple of 10 ms. In other words, when the normally exposed image is collected, exposure time of the electronic device is an integer multiple of 10 ms.

It should be understood that because exposure time of the normally exposed image is an integer multiple of 10 ms, there is no banding in the normally exposed image. In other words, there is no Luma banding in the image. In addition, a reason for the Chroma banding is: At the same time as energy changes, color temperature also changes, resulting in a color cast problem in the image. For example, if there are different colors in alternately light and dark banding in the Luma banding, there is the Chroma banding in the image. For example, dark banding is reddish, light banding is bluish, and the like. For the normally exposed image, each row of pixels receives the same energy, and there may be no energy fluctuation or the color cast problem in the normally exposed image. Therefore, there may be no Luma banding and Chroma banding in the normally exposed image.

Optionally, in this embodiment of this application, the electronic device may collect a multi-frame Raw image, and the multi-frame Raw image includes $S_A N_B$. $S_A$ represents A frames of short-exposed image, and $N_B$ represents B frames of normally exposed image. A is an integer greater than or equal to 1, and B is an integer greater than or equal to 1. The exposure time of the short-exposed image is less than 10 ms. The exposure time of the normally exposed image is an integer multiple of 10 ms.

Optionally, in this embodiment of this application, the electronic device may collect a multi-frame Raw image, and the multi-frame Raw image includes $S_A N_B L_C$. $S_A$ represents A frames of short-exposed image, $N_B$ represents B frames of normally exposed image, and $L_C$ represents C frames of long-exposed image. A is an integer greater than or equal to 1, B is an integer greater than or equal to 1, and C is an integer greater than or equal to 0. The exposure time of the short-exposed image is less than 10 ms. The exposure time of the normally exposed image is an integer multiple of 10 ms. Exposure time of the long-exposed image is greater than that of the normally exposed image.

For example, the multi-frame Raw image may refer to a seven-frame image of $S_4 N_2 L$, that is, a Raw image of SSSSNNL, where four-frame S is short-exposed Raw image in a preview frame; an exposure value of two-frame N is greater than or equal to that of the four-frame short-exposed image and exposure time is an integer multiple of 10 ms of the normally exposed image; and one frame L represents a long-exposed image.

Optionally, color space transformation processing (for example, demosaicing processing) may be performed on a normally exposed Raw image of a first frame in one or more collected normally exposed Raw images, to obtain an RGB image.

In this embodiment of this application, the normally exposed image may be obtained based on a normally exposed Raw image of a first frame in a multi-frame image. Because a time difference between the normally exposed Raw image of the first frame and the short-exposed Raw image is short, the normally exposed image is obtained based on the normally exposed Raw image of the first frame, and color transfer processing and brightness transfer processing are performed on the short-exposed image. This can avoid an introduction of motion ghosting to a specific extent.

Step S507: Input the short-exposed image and the normally exposed image to an image processing model for processing, to obtain a bilateral grid.

It should be understood that the bilateral grid refers to a data structure. In this embodiment of this application, the bilateral grid may be a grid matrix. The grid matrix includes a color correction transformation matrix and a brightness parameter (for example, brightness order). The color correction transformation matrix includes a red pixel gain (an R gain), a green pixel gain (a G gain), and a blue pixel gain (a B gain). A color and brightness of the normally exposed image may be transferred to the short-exposed image based on data in the bilateral grid, to remove the banding and the color cast image area in the short-exposed image.

For example, the bilateral grid may be a 32*32*8*9 grid matrix. 32*32 may represent a width and a height, and 8 may represent the brightness order; and 9 may represent the color correction transformation matrix, that is, a 3*3 matrix that acts on each RGB value.

Optionally, a network structure of the image processing model may be a convolutional neuron network. For example, the image processing model may be HDR Net. For a training method of the image processing model, refer to the following related description shown in FIG. 8.

Step S508: Process the short-exposed image based on the bilateral grid, to obtain an image obtained by removing banding and/or a local color cast area (an example of a third image).

Optionally, the color transfer processing may be performed on the short-exposed image based on the color transformation matrix in the bilateral grid, to remove the color cast image area in the short-exposed image; and/or the brightness transfer processing may be performed on the short-exposed image based on the brightness parameter in the bilateral grid, to remove the banding in the short-exposed image.

Optionally, interpolation processing may be performed on the short-exposed image based on the data in the bilateral grid, to obtain an image with banding removed.

For example, the data in the bilateral grid is multiplied by a pixel matrix of the short-exposed image to obtain the image with banding removed.

It should be noted that in step S506, after the first operation indicating photographing is detected, the normally exposed image is obtained. Optionally, in an implementation, when the electronic device is in a preview state, in other words, before the electronic device does not detect the first operation, the electronic device may use a stagger HDR (Stagger HDR) technology to obtain the short-exposed image and the normally exposed image.

It should be understood that stagger HDR refers to a technology of "long and short frame" photographing with "row" as an output unit. To be specific, the normally exposed image and the short-exposed image are obtained by using two exposures in time sequence.

It should be noted that in the method 500 shown in FIG. 7, an example in which the exposure time of the short-exposed image is less than 10 ms, and the exposure time of the normally exposed image is an integer multiple of 10 ms is used for description. This is not limited in this application.

Optionally, in this embodiment of this application, the exposure time of the short-exposed image and the exposure time of the normally exposed image are related to a number of times the flicker light source in the photographing environment in which the electronic device is located flickers per second. For example, the exposure time of the normally exposed image=an integer multiple of (1000/the number of times the flicker light source flickers per second) milliseconds.

For example, if a frequency of a working voltage of the flicker light source in the photographing environment is 50 HZ, in other words, the flicker light source flickers 100 times per second, the short-exposed image refers to an image with exposure time less than 10 ms, and the normally exposed image refers to an image with exposure time being an integer multiple of 10 ms.

For example, if a frequency of a working voltage of the flicker light source in the photographing environment is 60 HZ, in other words, the flicker light source flickers 120 times per second, the short-exposed image refers to an image with exposure time less than 8.3 ms, and the normally exposed image refers to an image with exposure time being an integer multiple of 8.3 ms.

Optionally, in step S501 to step S508 shown in FIG. 7, an example in which the banding and the color cast image area are removed in RGB color space is used for description. The foregoing step of removing the banding and the color cast image area may alternatively be performed in YUV color space. If the step is performed in the YUV color space, the short-exposed image and the normally exposed image may be YUV images.

Optionally, in step S501 to step S508 shown in FIG. 7, an example of the photographing scene of the electronic device is used for description. The method shown in FIG. 7 may be further applied to a video recording scene of the electronic device.

Optionally, an example of obtaining the bilateral grid based on the image processing model is used above for description. In this embodiment of this application, the first image and the second image may be registered and smoothed first; and a pixel-wise difference is performed between a registered first image and a registered second image, to obtain the color transformation matrix and/or the brightness parameter.

In this embodiment of this application, the light source of the photographing environment in which the electronic device is located is the flicker light source. When the electronic device needs to shorten exposure time during photographing a moving item, resulting in banding and/or a color cast image area in an image, in this embodiment of this application, color transfer and brightness transfer are performed on a short-exposed image by using a normally exposed image as a reference, to obtain a color transformation matrix and/or a brightness parameter. Color cast in a local image area in the short-exposed image may be removed based on the color transformation matrix; banding in the short-exposed image may be removed based on the brightness parameter; and it is ensured that banding in an image is removed (for example, banding and a color cast image area are removed) during collecting an image of the moving photographed object at a moment of motion to improve image quality.

In addition, in this embodiment of this application, the color transformation matrix and/or the brightness parameter are/is obtained based on the bilateral grid output by the image processing model. A difference in image content between the first image and the second image can be identified when the color transfer and the brightness transfer are performed on the first image by the image processing model. Therefore, the color transformation matrix and/or the brightness parameter are/is obtained by using the image processing model, so that a ghost area does not be introduced when color adjustment and/or brightness adjustment are/is performed on the first image, thereby improving image quality.

FIG. 8 is a schematic flowchart of a training method for an image processing model according to an embodiment of this application. The method 600 may be performed by the electronic device shown in FIG. 1. The method 600 includes step S610 to step S650. The following describes step S610 to step S650 in detail separately.

Step S610: Obtain training data.

The training data includes a first sample image, a second sample image, and a third sample image. The first sample image is an image without banding. The second sample image is an image obtained by adding banding in a first image. The third sample image is an image without banding and image quality of the third sample image is higher than image quality of the first sample image.

For example, the third sample image may be an ISP-processed RGB image without banding. The first sample image may be an RGB image obtained by performing color space transformation based on a normally exposed sample Raw image. Therefore, the image quality of the third sample image is higher than the image quality of the first sample image.

Step S620: Input the first sample image and the second sample image to a to-be-trained image processing model, to obtain a predicted bilateral grid.

It should be noted that the image processing model is configured to learn a color difference and a brightness difference between an image without banding and an image with banding in the same photographing scene. An objective is to transfer a color and brightness in the image with banding to the image without banding by using the output predicted bilateral grid.

Optionally, a network structure of the image processing model may be a VGG network or HDR Net.

Step S630: Perform interpolation processing on the first sample image based on the predicted bilateral grid, to obtain a predicted image.

For example, data in the bilateral grid may be multiplied by data of the first sample image to obtain the predicted image.

Step S640: Update a parameter of the image processing model based on a difference between the predicted image and the third sample image, to obtain a trained image processing model.

For example, a difference between pixels in the predicted image and the third sample image may be calculated, and the to-be-trained image processing model is trained through a back propagation algorithm, so that a loss function of the to-be-trained image processing model converges, and the trained image processing model is obtained.

Optionally, in this embodiment of this application, it is considered that a Chroma Banding image processing model may include eight parameters. The eight parameters are $A*3$, $a*1$, $b*1$, and $c*3$. A represents an amplitude; a represents frequency; b represents an initial phase; c represents an offset term; $A*3$ represents an amplitude corresponding to an RGB pixel; and $c*3$ represents an offset term corresponding to an RGB pixel.

In this embodiment of this application, a bilateral grid that transfers a color and brightness of an image frame obtained with normal exposure time or long exposure time to an image frame with short exposure time may be obtained by using the image processing model. In a photographing scene with a flicker light source with a 50 HZ alternating current, because the normal exposure time or long exposure time is an integer multiple of 10 ms, image banding or a color cast image area usually does not exist in a long-exposed image and a normally exposed image. A color transformation matrix and/or a brightness parameter are/is obtained based on the bilateral grid output by the image processing model. A difference in image content between the first image and the second image can be identified when the color transfer and the brightness transfer are performed on the first image by the image processing model. Therefore, the color transformation matrix and/or the brightness parameter are/is obtained by using the image processing model, so that a ghost area does not be introduced when color adjustment and/or brightness adjustment are/is performed on the first image, thereby improving image quality.

The following describes an example of a schematic diagram of an interface in an electronic device with reference to FIG. 9A to FIG. 13D.

Figure 9A:
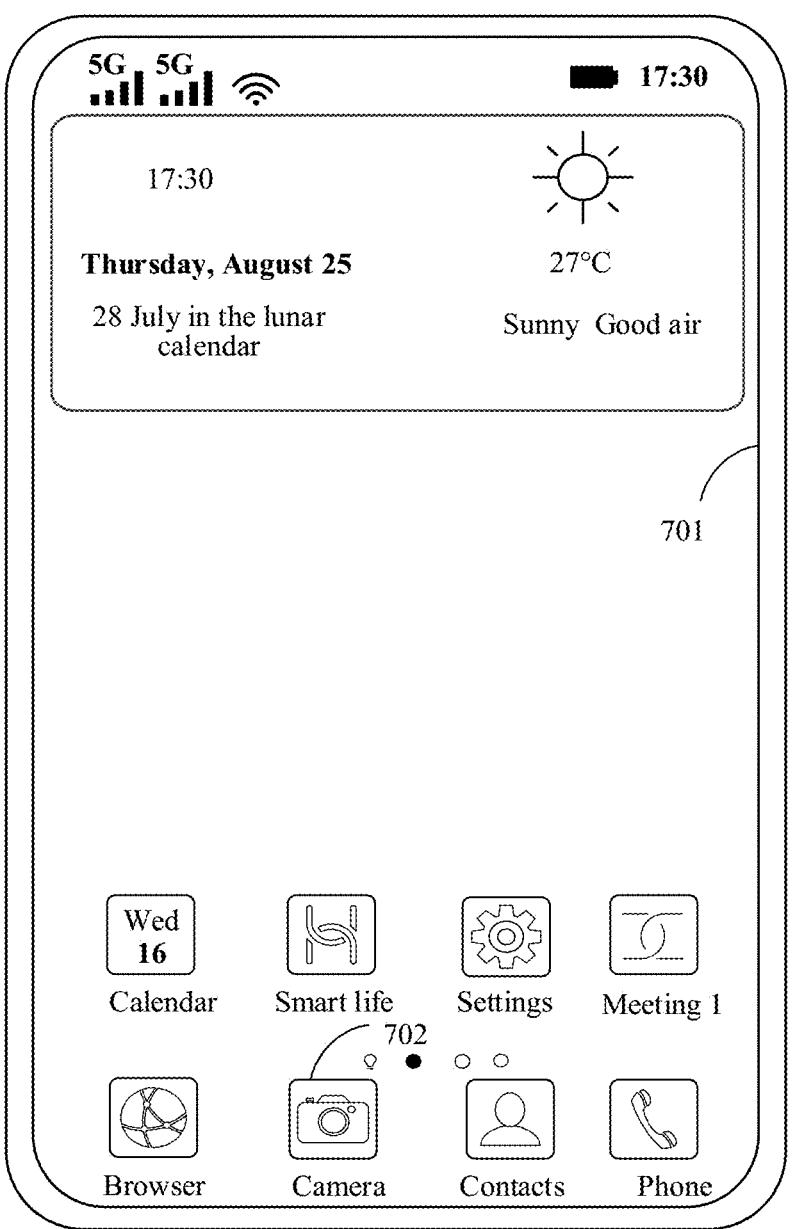
FIG. 9A and FIG. 9B are a schematic diagram of a graphical user interface applicable to an embodiment of this application.
Figure 9B:
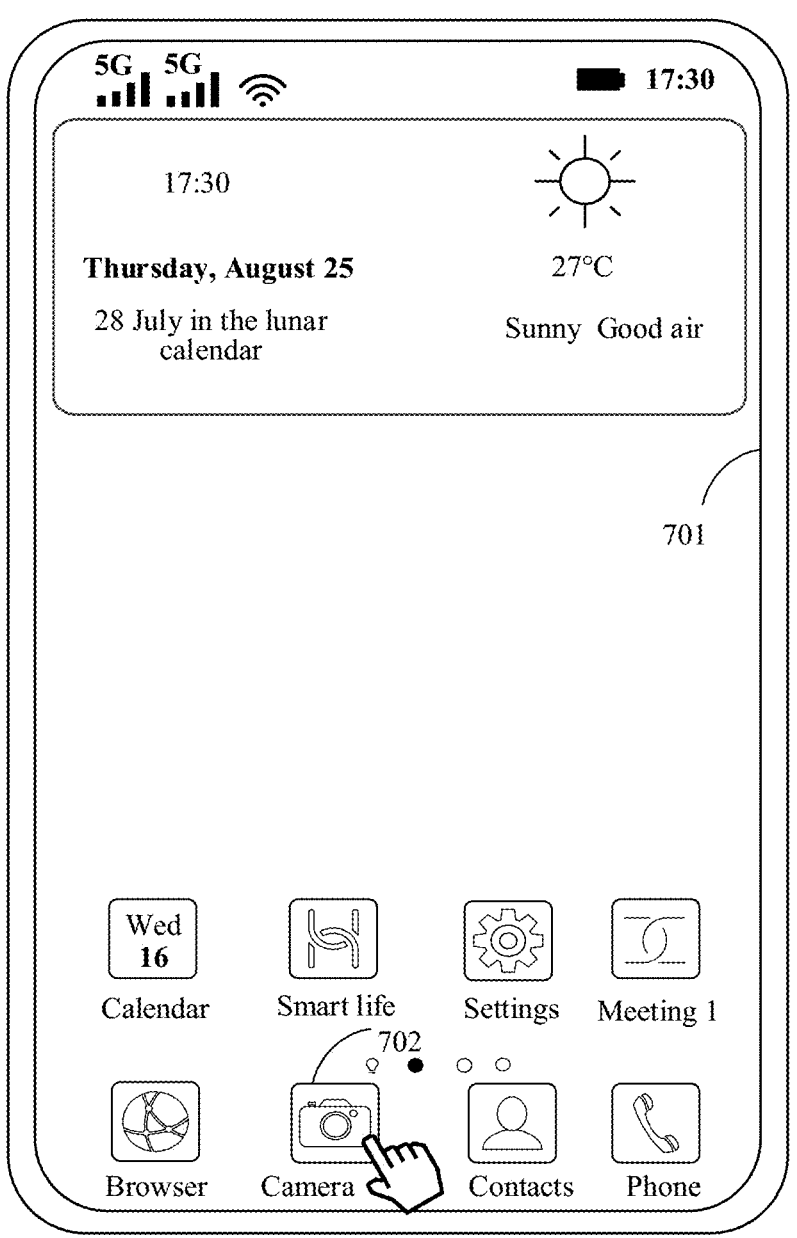

FIG. 9A and FIG. 9B are a schematic diagram of an interface of an electronic device according to an embodiment of this application.

In this embodiment of this application, after the electronic device runs a camera application, a preview image displayed in a preview interface displayed on the electronic device includes banding and/or a color cast area. After the electronic device detects that a user taps a control, the image processing method provided in embodiments of this application may be performed, in other words, image banding removal processing may be performed. When the user taps a photographing control, the electronic device collects an image. The collected image is an image obtained by removing banding and/or a color cast area, that is, an image output after the image banding removal processing.

For example, after detecting an operation of tapping a control 703 as shown in FIG. 9B, the electronic device performs the image processing method provided in embodiments of this application.

Figure 10B:
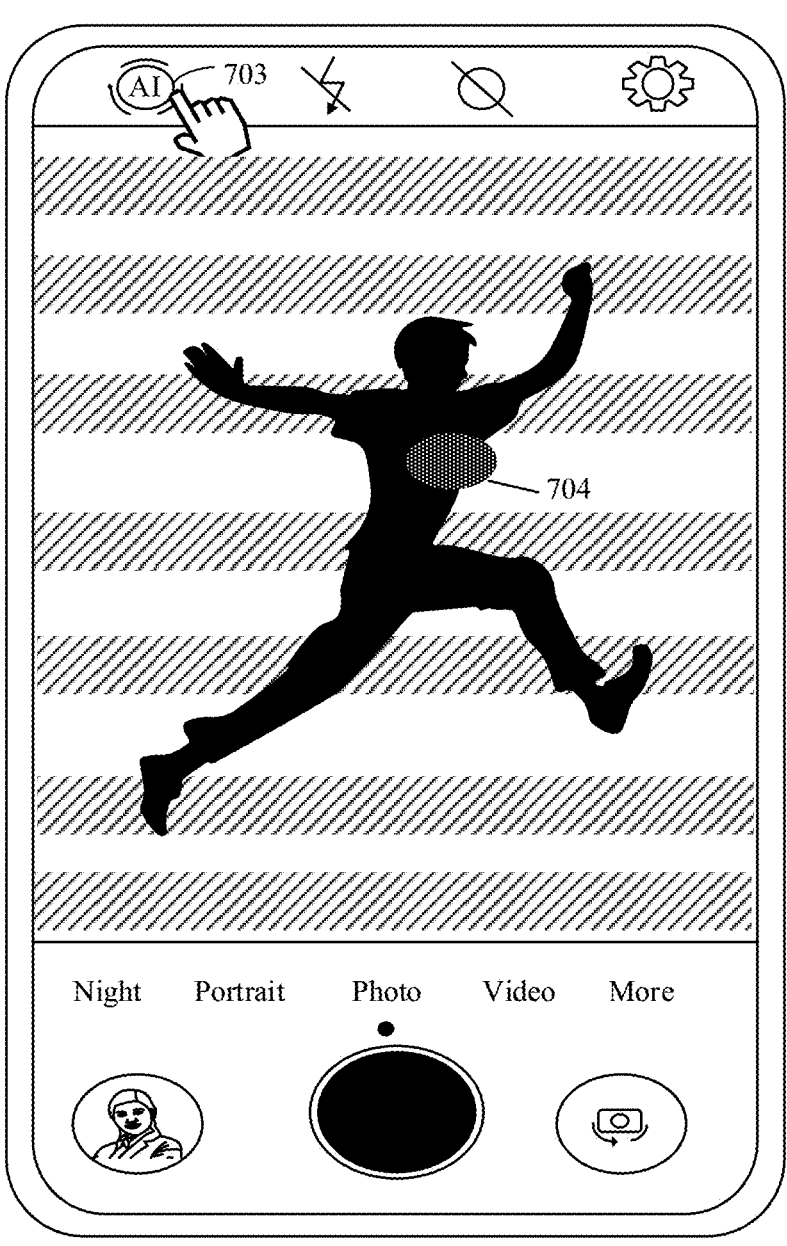

For example, as shown in FIG. 9A and FIG. 9B, a graphical user interface (graphical user interface, GUI) shown in FIG. 9A is a home screen 701 of the electronic device. The electronic device detects that the user taps a control 702 of a camera application on the home screen 701, as shown in FIG. 9B. After detecting that the user taps the control 702 of the camera application on the home screen 701, the electronic device runs the camera application. For example, as shown in FIG. 10A, the electronic device may display a photographing preview interface. The photographing preview interface includes a preview image and a control 703. The preview image includes alternately light and dark banding and an image area 704. The image area 704 may be red, green, blue, or another color. The electronic device detects an operation of the user tapping the control 703, as shown in FIG. 10B. After detecting the operation of the user tapping the control 703, the electronic device may perform the image processing method provided in embodiments of this application and display a preview interface as shown in FIG. 11A. The preview interface includes a photographing control 705. The electronic device detects an operation of the user tapping the photographing control 705, as shown in FIG. 11B. After detecting the operation of the user tapping the photographing control 705, the electronic device displays a display interface as shown in FIG. 11C, and the display interface includes an album control 706. The electronic device detects an operation of the user tapping the album control 706, as shown in FIG. 11D. After detecting the operation of the user tapping the album control 706, the electronic device displays an interface as shown in FIG. 12.

Figure 13A:
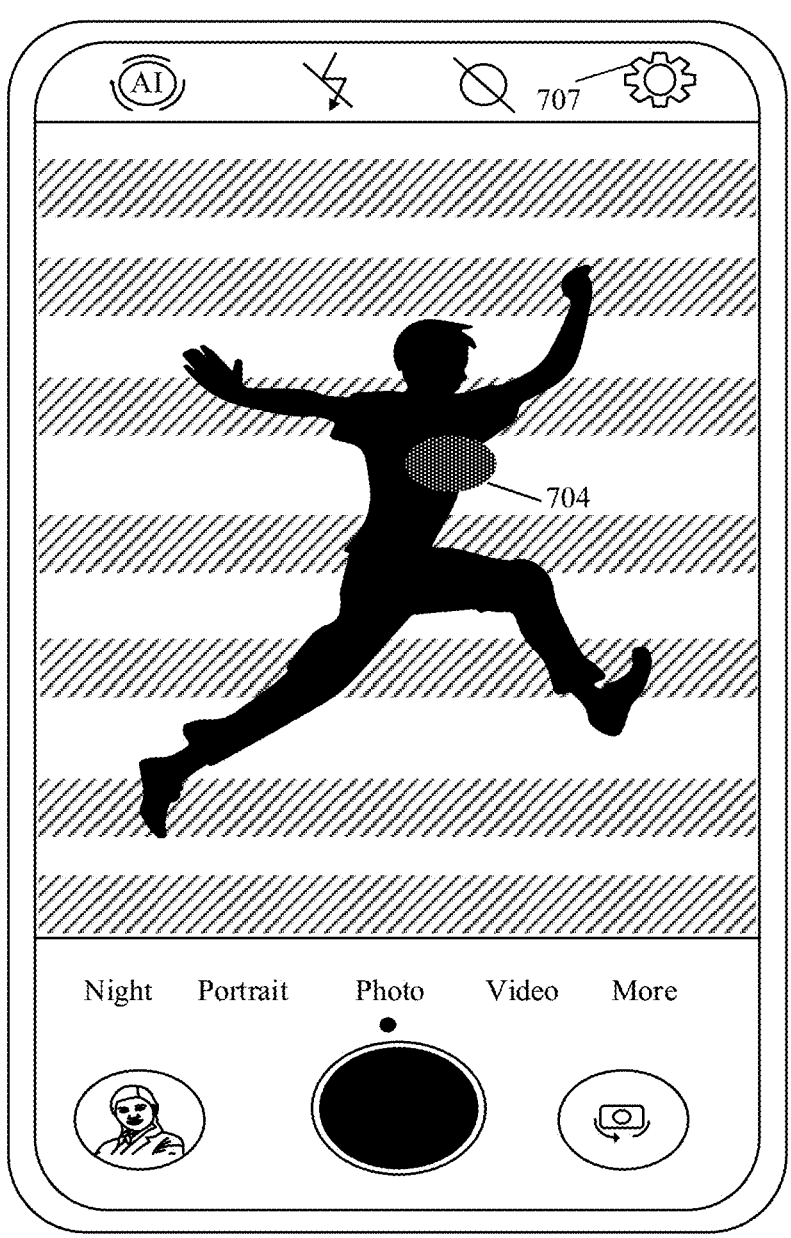
FIG. 13A to FIG. 13D are a schematic diagram of a graphical user interface applicable to an embodiment of this application.
Figure 13B:
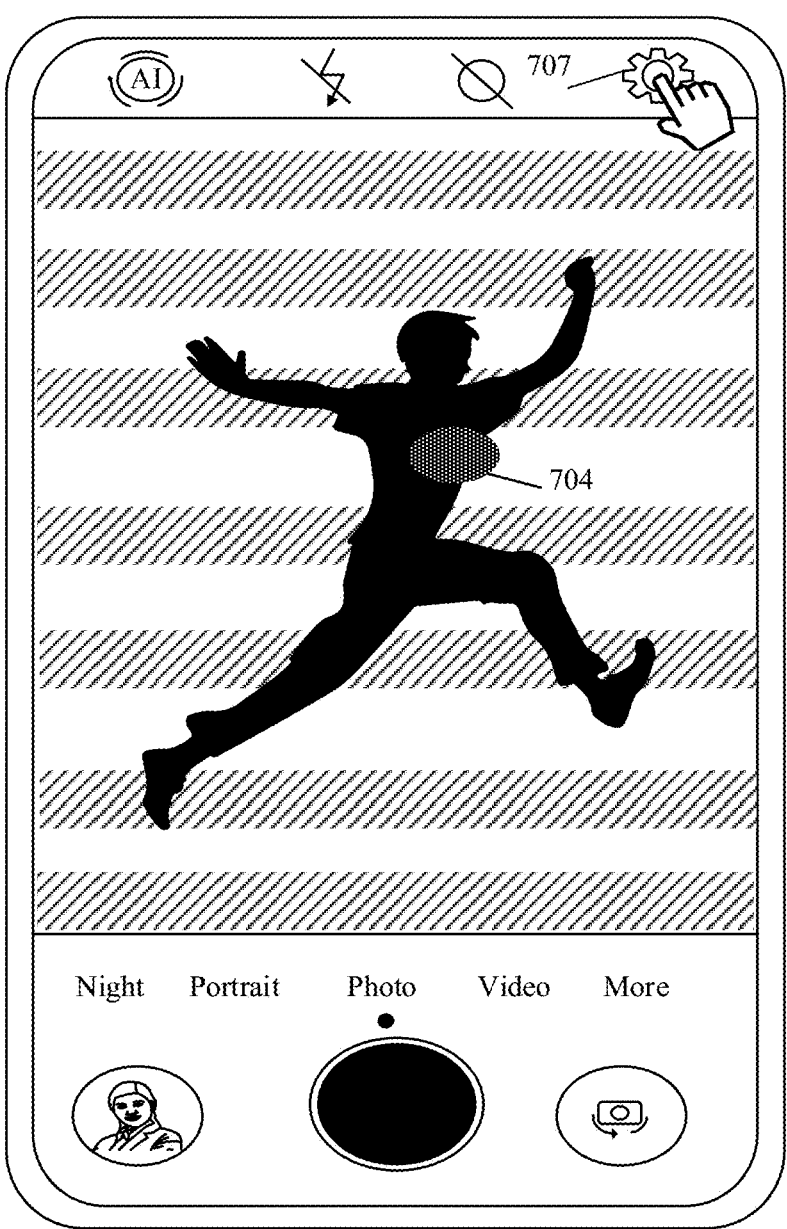
Figure 13C:
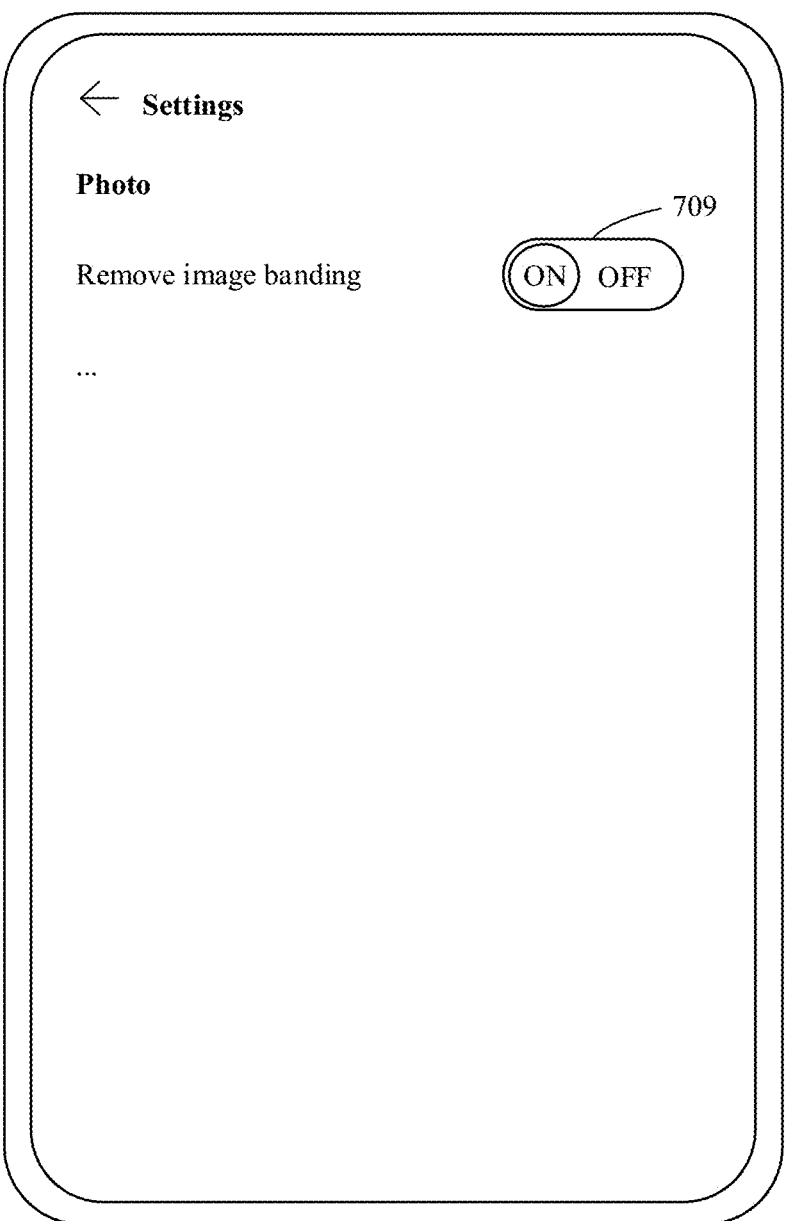
Figure 13D:
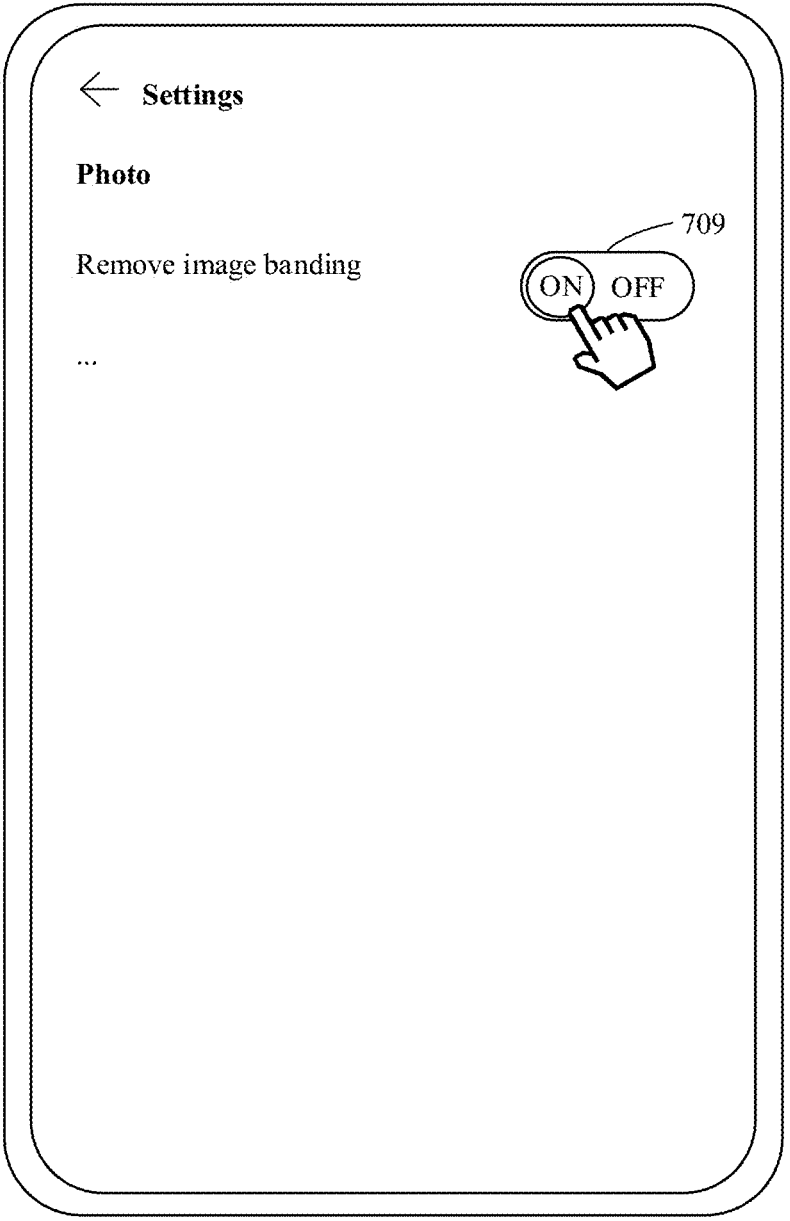

For example, after detecting an operation of tapping a control 709 as shown in FIG. 13D, the electronic device performs the image processing method provided in embodiments of this application.

For example, after running the camera application in the electronic device, a preview interface as shown in FIG. 13A may be displayed. The preview interface includes a preview image and a control 707. The preview image includes alternately light and dark banding and an image area 704. The image area 704 may be red, green, blue, or another color. The electronic device detects an operation of the user tapping the control 707, as shown in FIG. 13B. After detecting the operation of the user tapping the control 707, the electronic device displays a setting interface, as shown in FIG. 13C. The setting interface includes a control 709 for removing image banding. The electronic device detects an operation of the user tapping the control 709 for removing image banding, as shown in FIG. 13D. After detecting the operation of the user tapping the control 709 for removing image banding, the electronic device performs the image processing method provided in embodiments of this application.

It should be noted that the above is an example of a display interface in an electronic device. This is not limited in this application.

It should be understood that the foregoing example is merely intended to help a person skilled in the art to understand embodiments of this application, and is not intended to limit embodiments of this application to specific values or specific scenarios in the example. Obviously, a person skilled in the art may make various equivalent modifications or variations according to the given example. The modifications or variations also fall with the scope of embodiments of this application.

The image processing method provided in embodiments of this application is described above in detail with reference to FIG. 1 to FIG. 13D. Apparatus embodiments of this application are described below in detail with reference to FIG. 14 and FIG. 15. It should be understood that an apparatus in this embodiment of this application may perform various methods in the foregoing embodiments of this application. In other words, for specific work processes of the following various products, refer to corresponding processes in the foregoing method embodiments.

Figure 14:
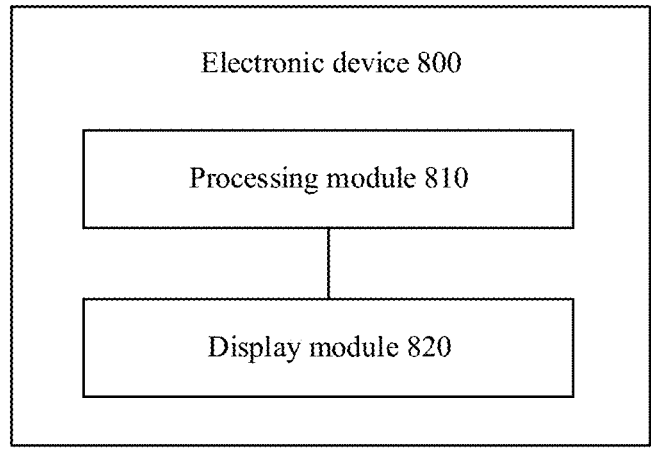
FIG. 14 is a schematic diagram of a structure of an electronic device according to an embodiment of this application.

FIG. 14 is a schematic diagram of a structure of an electronic device according to an embodiment of this application. The electronic device 800 includes a processing module 810 and a display module 820.

It should be noted that a light source of a photographing environment in which the electronic device is located is a flicker light source.

The processing module 810 is configured to run a camera application of the electronic device. The display module 820 is configured to display a first image, where the first image is an image of a photographed object collected based on first exposure time, the photographed object is a moving object, the first exposure time is less than first duration, and the first image includes banding and/or a color cast image area. The processing module 810 is further configured to: detect a first operation, where the first operation indicates the electronic device to take a photo or a video; obtain a second image in response to the first operation, where the second image is an image of the photographed object collected based on second exposure time, and the second exposure time is an integer multiple of the first duration; obtain a color transformation matrix and/or a brightness parameter based on the first image and the second image, where the color transformation matrix is used for adjusting a color of the first image, and the brightness parameter is used for adjusting brightness of the first image; perform first image processing on the first image based on the color transformation matrix and/or the brightness parameter, to obtain a third image, where the third image is an image obtained by removing the banding and/or the color cast image area; and display or save the third image.

Optionally, in an embodiment, the processing module 810 is further configured to:

input the first image and the second image to an image processing model to obtain bilateral grid data, where the image processing model is configured to perform color transfer processing and brightness transfer processing on the first image by using the second image as a reference, the bilateral grid data includes the color transformation matrix and/or the brightness parameter, and a size of the first image is the same as a size of the second image.

Optionally, in an embodiment, the processing module 810 is specifically configured to:

perform interpolation processing on the first image based on the color transformation matrix and/or the brightness parameter, to obtain the third image.

Optionally, in an embodiment, the processing module 810 is specifically configured to:

perform, in first color space, the first image processing on the first image based on the color transformation matrix and/or the brightness parameter, to obtain a processed image; and perform second image processing on the processed image in the first color space, to obtain the third image, where the second image processing is a color processing algorithm in the first color space.

Optionally, in an embodiment, the processing module 810 is further configured to: detect a photographing scene in which the electronic device is located, and detect the moving object; and detect that the banding and/or the color cast image area are/is present in the first image.

Optionally, in an embodiment, the first duration is obtained based on a number of times the flicker light source flickers per second.

Optionally, in an embodiment, the first duration=1000/the number of times the flicker light source flickers per second.

Optionally, in an embodiment, the number of times the flicker light source flickers per second is related to a frequency of a working voltage of the flicker light source.

Optionally, in an embodiment, the image processing model is a convolutional neuron network.

Optionally, in an embodiment, the image processing model is trained by the following methods:

obtaining sample data, where the sample data includes a first sample image, a second sample image, and a third sample image, the second sample image includes image content and banding and/or a color cast image area of the first sample image, the third sample image has the same image content as the first sample image, and image quality of the third sample image is higher than image quality of the first sample image;

inputting the first sample image and the second sample image to a to-be-trained image processing model, to obtain predicted bilateral grid data;

performing interpolation processing on the second sample image based on the predicted bilateral grid data, to obtain a predicted image; and training the to-be-trained image processing model based on a difference between the predicted image and the third sample image, to obtain the image processing model.

Optionally, in an embodiment, the electronic device includes an image signal processor, and the first image is an image output by the image signal processor.

Optionally, in an embodiment, the second image is an image obtained by performing third image processing on a Raw image collected by the electronic device, and the third image processing includes color space transformation processing.

It should be noted that the electronic device 800 is embodied in a form of a functional module. The term "module" herein may be implemented in a form of software and/or hardware. This is not specifically limited.

For example, the "module" may be a software program or a hardware circuit that implements the foregoing functions, or a combination thereof. The hardware circuit may include an application specific integrated circuit (application specific integrated circuit, ASIC), an electronic circuit, a processor (for example, a shared processor, a dedicated processor, or a packet processor) configured to execute one or more software or firmware programs, a memory, a combined logical circuit, and/or another suitable component that supports the described functions.

Therefore, the units in the examples described in embodiments of this application may be implemented by electronic hardware or a combination of computer software and electronic hardware. Whether the functions are executed in a manner of hardware or software depends on particular applications and design constraint conditions of the technical solutions. A person skilled in the art may use different methods to implement the described functions for each particular application, but it should not be considered that the implementation goes beyond the scope of this application.

Figure 15:
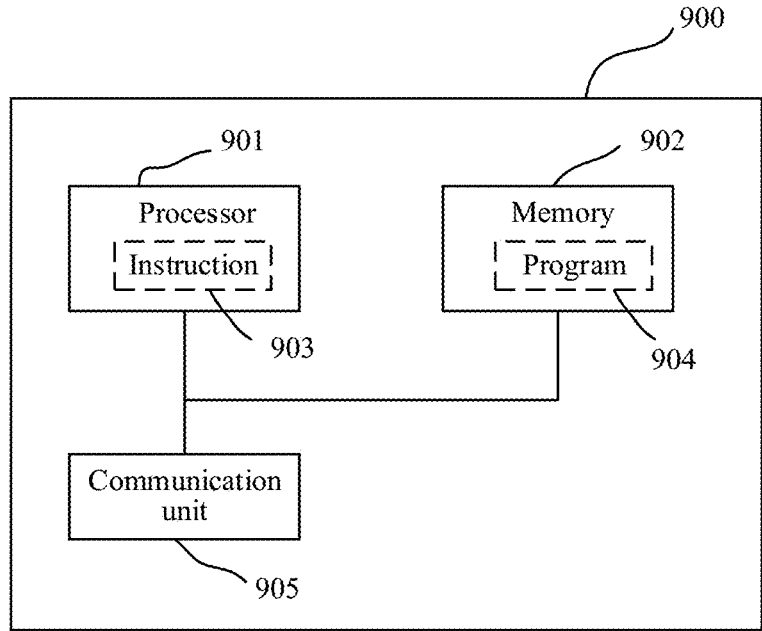
FIG. 15 is a schematic diagram of a structure of an electronic device according to an embodiment of this application.

FIG. 15 is a schematic diagram of a structure of an electronic device according to an embodiment of this application. A dash line in FIG. 15 represents that a unit or module is optional. The electronic device 900 may be configured to implement the image processing method described in the foregoing method embodiments.

The electronic device 900 includes one or more processors 901, and the one or more processors 901 support the electronic device 900 to implement the image processing method in the method embodiments. The processor 901 may be a general-purpose processor or a dedicated purpose processor. For example, the processor 901 may be a central processor (central processing unit, CPU), a digital signal processor (digital signal processor, DSP), an application specific integrated circuit (application specific integrated circuit, ASIC), a field programmable gate array (field programmable gate array, FPGA), or another programmable logic device, such as a discrete gate, a transistor logic device, or a discrete hardware component.

Optionally, the processor 901 may be configured to control the electronic device 900, execute a software program, and process data of the software program. The electronic device 900 may further include a communication unit 905, configured to implement input (receiving) and output (sending) of a signal.

For example, the electronic device 900 may be a chip, and the communication unit 905 may be an input and/or output circuit of the chip, or the communication unit 905 may be a communication interface of the chip, and the chip may be used as a component of a terminal device or another electronic device.

For another example, the electronic device 900 may be a terminal device, and the communication unit 905 may be a transceiver of the terminal device, or the communication unit 905 may in 900 may include one or more memories 902 that store a program 904. The program 904 may be run by the processor 901 to generate an instruction 903, so that the processor 901 performs, based on the instruction 903, the image processing method described in the foregoing method embodiments.

Optionally, the memory 902 may further store data.

Optionally, the processor 901 may further read the data stored in the memory 902. The data may be stored at a same storage address as that of the program 904, or the data may be stored at a different storage address from that of the program 904.

Optionally, the processor 901 and the memory 902 may be disposed separately or integrated together, for example, integrated on a system on chip (system on chip, SOC) of the terminal device.

For example, the memory 902 may be configured to store the program 904 related to the image processing method provided in embodiments of this application, and the processor 901 may be configured to, when performing an image processing method, invoke the program 904 related to the image processing method stored in the memory 902, to perform the image processing method in embodiments of this application: for example, running a camera application in the electronic device; displaying a first image, where the first image is an image of a photographed object collected based on first exposure time, the photographed object is a moving object, the first exposure time is less than first duration, and the first image includes banding and/or a color cast image area; detecting a first operation, where the first operation indicates the electronic device to take a photo or a video; obtaining a second image in response to the first operation, where the second image is an image of the photographed object collected based on second exposure time, and the second exposure time is an integer multiple of the first duration; obtaining a color transformation matrix and/or a brightness parameter based on the first image and the second image, where the color transformation matrix is used for adjusting a color of the first image, and the brightness parameter is used for adjusting brightness of the first image; performing first image processing on the first image based on the color transformation matrix and/or the brightness parameter, to obtain a third image, where the third image is an image obtained by removing the banding and/or the color cast image area; and displaying or saving the third image.

Optionally, this application further provides a computer program product. When the computer program product is executed by the processor 901, the image processing method according to any method embodiment of this application is implemented.

For example, the computer program product may be stored in the memory 902, and may be, for example, the program 904. The program 904 undergoes processing processes such as preprocessing, compiling, assembling, and linking, to be finally converted into an executable target file that can be executed by the processor 901.

Optionally, this application further provides a computer-readable storage medium, having a computer program stored thereon. When the computer program is executed by a computer, the image processing method according to any method embodiment of this application is implemented. The computer program may be a program in a high-level programming language, or may be an executable target program.

For example, the computer-readable storage medium is, for example, the memory 902. The memory 902 may be a volatile memory or a non-volatile memory, or the memory 902 may simultaneously include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. Through illustrative but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

A person of ordinary skill in the art may be aware that in combination with the examples described in embodiments disclosed in this specification, units and algorithm steps may be implemented by electronic hardware or a combination of computer software and electronic hardware. Whether the functions are executed in a manner of hardware or software depends on particular applications and design constraint conditions of the technical solutions. A person skilled in the art may use different methods to implement the described functions for each particular application, but it should not be considered that the implementation goes beyond the scope of this application.

A person skilled in the art can clearly understand that for convenience and conciseness of description, for specific working processes of the foregoing systems, devices, and units, reference may be made to the corresponding processes in the foregoing method embodiments, and details are not described herein again.

In the several embodiments provided in this application, it should be understood that the disclosed system, apparatus, and method may be implemented in other manners. For example, the described embodiment of the electronic device is merely an example. For example, the module division is merely logical function division and may be another division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate components may or may not be physically separated, and components displayed as units may or may not be physical units, may be located in one place, or may be distributed on a plurality of network units. Some or all of the units may be selected according to actual needs to achieve the objectives of the solutions of embodiments.

In addition, functional units in embodiments of this application may be integrated into one processing unit, each of the units may exist alone physically, or two or more units may be integrated into one unit.

It should be understood that sequence numbers of the processes do not mean execution sequences in various embodiments of this application. The execution sequences of the processes should be determined according to functions and internal logic of the processes, and should not be constituted as any limitation on the implementation processes of embodiments of this application.

In addition, the term "and/or" used in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

If the functions are implemented in the form of a software functional unit and sold or used as an independent product, the function may be stored in a computer-readable storage medium. Based on such understanding, the technical solutions of this application essentially, or the part contributing to the conventional technologies, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, and an optical disc.

The foregoing descriptions are merely specific implementations of this application, and are not intended to limit the protection scope of this application. Any variation or replacement readily figured out by a person skilled in the art within the technical scope disclosed in this application shall fall within the protection scope of this application. Therefore, the protection scope of this application is subject to the protection scope of the claims. To sum up, the above descriptions are merely embodiments of the technical solutions of this application, and are not intended to limit the protection scope of this application. Any modification, equivalent replacement, improvement, and the like made within the spirit and principle of this application shall fall within the protection scope of this application.

The invention claimed is:

1. An image processing method, applied to an electronic device, wherein a light source of a photographing environment in which the electronic device is located is a flicker light source, and the image processing method comprises:

running a camera application in the electronic device;

displaying a first image, wherein the first image is an image of a photographed object collected based on first exposure time, the photographed object is a moving object, the first exposure time is less than a first duration, and the first image comprises banding and/or a color cast image area;

detecting a first operation, wherein the first operation indicates the electronic device to take a photo or a video;

obtaining a second image in response to the first operation, wherein the second image is an image of the photographed object collected based on a second exposure time, and the second exposure time is an integer multiple of the first duration;

obtaining a color transformation matrix and/or a brightness parameter based on the first image and the second image, wherein the color transformation matrix is used for adjusting a color of the first image, and the brightness parameter is used for adjusting brightness of the first image, and obtaining the color transformation matrix and/or a brightness parameter based on the first image and the second image comprises:

inputting the first image and the second image to an image processing model to obtain bilateral grid data, wherein the image processing model is configured to perform color transfer processing and brightness transfer processing on the first image by using the second image as a reference, the bilateral grid data comprises the color transformation matrix and/or the brightness parameter, and a size of the first image is the same as a size of the second image;

performing first image processing on the first image based on the color transformation matrix and/or the brightness parameter, to obtain a third image, wherein the third image is an image obtained by removing the banding and/or the color cast image area; and displaying or saving the third image.

2. The image processing method according to claim 1, wherein the performing first image processing on the first image based on the color transformation matrix and/or the brightness parameter, to obtain a third image comprises:

performing interpolation processing on the first image based on the color transformation matrix and/or the brightness parameter, to obtain the third image.

3. The image processing method according to claim 2, wherein the performing interpolation processing on the first image based on the color transformation matrix and/or the brightness parameter, to obtain the third image comprises:

performing, in first color space, the first image processing on the first image based on the color transformation matrix and/or the brightness parameter, to obtain a processed image; and performing second image processing on the processed image in the first color space, to obtain the third image, wherein the second image processing is a color processing algorithm in the first color space.

4. The image processing method according to claim 1, wherein before the obtaining a second image, the method further comprises:

detecting a photographing scene in which the electronic device is located, and detecting the moving object; and detecting that the banding and/or the color cast image area are/is present in the first image.

5. The image processing method according to claim 1, wherein the first duration is obtained based on a number of times the flicker light source flickers per second.

6. The image processing method according to claim 5, wherein the first duration =1000/the number of times the flicker light source flickers per second.

7. The image processing method according to claim 6, wherein the number of times the flicker light source flickers per second is related to a frequency of a working voltage of the flicker light source.

8. The image processing method according to claim 1, wherein the image processing model is a convolutional neuron network.

9. The image processing method according to claim 1, wherein the image processing model is trained by the following methods:

obtaining sample data, wherein the sample data comprises a first sample image, a second sample image, and a third sample image, the second sample image comprises image content and banding and/or a color cast image area of the first sample image, the third sample image has the same image content as the first sample image, and image quality of the third sample image is higher than image quality of the first sample image;

inputting the first sample image and the second sample image to a to-be-trained image processing model, to obtain predicted bilateral grid data;

performing interpolation processing on the second sample image based on the predicted bilateral grid data, to obtain a predicted image; and training the to-be-trained image processing model based on a difference between the predicted image and the third sample image, to obtain the image processing model.

10. The image processing method according to claim 1, wherein the electronic device comprises an image signal processor, and the first image is an image output by the image signal processor.

11. The image processing method according to claim 1, wherein the second image is an image obtained by performing third image processing on a Raw image collected by the electronic device, and the third image processing comprises color space transformation processing.

12. An electronic device, comprising:

one or more processors and a memory, wherein the memory is coupled to the one or more processors, the memory stores computer program code, the computer program code comprises computer instructions, and the one or more processors invoke the computer instructions to enable the electronic device to perform operations comprising:

running a camera application in the electronic device;

displaying a first image, wherein the first image is an image of a photographed object collected based on first exposure time, the photographed object is a moving object, the first exposure time is less than first duration, and the first image comprises banding and/or a color cast image area;

detecting a first operation, wherein the first operation indicates the electronic device to take a photo or a video;

obtaining a second image in response to the first operation, wherein the second image is an image of the photographed object collected based on second exposure time, and the second exposure time is an integer multiple of the first duration;

obtaining a color transformation matrix and/or a brightness parameter based on the first image and the second image, wherein the color transformation matrix is used for adjusting a color of the first image, and the brightness parameter is used for adjusting brightness of the first image, wherein obtaining the color transformation matrix and/or a brightness parameter based on the first image and the second image comprises:

inputting the first image and the second image to an image processing model to obtain bilateral grid data, wherein the image processing model is configured to perform color transfer processing and brightness transfer processing on the first image by using the second image as a reference, the bilateral grid data comprises the color transformation matrix and/or the brightness parameter, and a size of the first image is the same as a size of the second image;

performing first image processing on the first image based on the color transformation matrix and/or the brightness parameter, to obtain a third image, wherein the third image is an image obtained by removing the banding and/or the color cast image area; and displaying or saving the third image.

13. A chip system, wherein the chip system is used in an electronic device, the chip system comprises one or more processors, and the processors are configured to invoke computer instructions to enable the electronic device to perform operations comprising:

running a camera application in the electronic device;

displaying a first image, wherein the first image is an image of a photographed object collected based on first exposure time, the photographed object is a moving object, the first exposure time is less than first duration, and the first image comprises banding and/or a color cast image area;

detecting a first operation, wherein the first operation indicates the electronic device to take a photo or a video;

obtaining a second image in response to the first operation, wherein the second image is an image of the photographed object collected based on second exposure time, and the second exposure time is an integer multiple of the first duration;

obtaining a color transformation matrix and/or a brightness parameter based on the first image and the second image, wherein the color transformation matrix is used for adjusting a color of the first image, and the brightness parameter is used for adjusting brightness of the first image, wherein obtaining the color transformation matrix and/or a brightness parameter based on the first image and the second image comprises:

inputting the first image and the second image to an image processing model to obtain bilateral grid data, wherein the image processing model is configured to perform color transfer processing and brightness transfer processing on the first image by using the second image as a reference, the bilateral grid data comprises the color transformation matrix and/or the brightness parameter, and a size of the first image is the same as a size of the second image;

performing first image processing on the first image based on the color transformation matrix and/or the brightness parameter, to obtain a third image, wherein the third image is an image obtained by removing the banding and/or the color cast image area; and displaying or saving the third image.

14. The image processing method according to claim 1, wherein the performing first image processing on the first image based on the color transformation matrix and/or the brightness parameter, to obtain a third image comprises:

performing, in first color space, the first image processing on the first image based on the color transformation matrix and/or the brightness parameter, to obtain a processed image; and performing second image processing on the processed image in the first color space, to obtain the third image, wherein the second image processing is a color processing algorithm in the first color space.

15. The electronic device according to claim 12, wherein the performing first image processing on the first image based on the color transformation matrix and/or the brightness parameter, to obtain a third image comprises:

performing, in first color space, the first image processing on the first image based on the color transformation matrix and/or the brightness parameter, to obtain a processed image; and performing second image processing on the processed image in the first color space, to obtain the third image, wherein the second image processing is a color processing algorithm in the first color space.

16. The image processing method according to claim 8, wherein the image processing model is trained by the following methods:

obtaining sample data, wherein the sample data comprises a first sample image, a second sample image, and a third sample image, the second sample image comprises image content and banding and/or a color cast image area of the first sample image, the third sample image image has the same image content as the first sample image, and image quality of the third sample image is higher than image quality of the first sample image;

inputting the first sample image and the second sample image to a to-be-trained image processing model, to obtain predicted bilateral grid data;

performing interpolation processing on the second sample image based on the predicted bilateral grid data, to obtain a predicted image; and training the to-be-trained image processing model based on a difference between the predicted image and the third sample image, to obtain the image processing model.

17. The chip system according to claim 13, wherein the performing first image processing on the first image based on the color transformation matrix and/or the brightness parameter, to obtain a third image comprises:

performing, in first color space, the first image processing on the first image based on the color transformation matrix and/or the brightness parameter, to obtain a processed image; and performing second image processing on the processed image in the first color space, to obtain the third image, wherein the second image processing is a color processing algorithm in the first color space.

18. The electronic device according to claim 12, wherein performing first image processing on the first image based on the color transformation matrix and/or the brightness parameter, to obtain the third image comprises:

performing interpolation processing on the first image based on the color transformation matrix and/or the brightness parameter, to obtain the third image.

19. The chip system according to claim 13, wherein performing first image processing on the first image based on the color transformation matrix and/or the brightness parameter, to obtain the third image comprises:

performing interpolation processing on the first image based on the color transformation matrix and/or the brightness parameter, to obtain the third image.

20. The electronic device according to claim 12, wherein the one or more processors invoke the computer instructions to enable the electronic device to perform operations further comprising:

detecting a photographing scene in which the electronic device is located, and detecting the moving object; and detecting that the banding and/or the color cast image area are/is present in the first image.

* * * * *